(12) United States Patent
Hajjar

(10) Patent No.: US 9,729,837 B2
(45) Date of Patent: Aug. 8, 2017

(54) LOCAL DIMMING ON LIGHT-EMITTING SCREENS FOR IMPROVED IMAGE UNIFORMITY IN SCANNING BEAM DISPLAY SYSTEMS

(71) Applicant: Prysm, Inc., San Jose, CA (US)

(72) Inventor: Roger A. Hajjar, San Jose, CA (US)

(73) Assignee: PRYSM, INC., San Jose, CA (US)

( * ) Notice: Subject to any disclaimer, the term of this patent is extended or adjusted under 35 U.S.C. 154(b) by 43 days.

(21) Appl. No.: 14/977,395

(22) Filed: Dec. 21, 2015

(65) Prior Publication Data

US 2016/0112686 A1    Apr. 21, 2016

Related U.S. Application Data

(63) Continuation of application No. 12/796,591, filed on Jun. 8, 2010, now Pat. No. 9,217,862.

(51) Int. Cl.
| | |
|---|---|
| *H04N 9/31* | (2006.01) |
| *G09G 3/02* | (2006.01) |
| *G09G 3/20* | (2006.01) |
| *G02B 26/12* | (2006.01) |

(52) U.S. Cl.
CPC ......... *H04N 9/3129* (2013.01); *G02B 26/123* (2013.01); *G02B 26/125* (2013.01); *G02B 26/127* (2013.01); *G09G 3/025* (2013.01); *G09G 3/2003* (2013.01); *G09G 3/2011* (2013.01); *G09G 3/2018* (2013.01); *H04N 9/3155* (2013.01); *H04N 9/3179* (2013.01); *H04N 9/3194* (2013.01); *G09G 3/2014* (2013.01)

(58) Field of Classification Search
None
See application file for complete search history.

(56) References Cited

U.S. PATENT DOCUMENTS

| | | | |
|---|---|---|---|
| 2006/0227087 | A1 | 10/2006 | Hajjar et al. |
| 2007/0008267 | A1 | 1/2007 | Li et al. |
| 2007/0187616 | A1 | 8/2007 | Burroughs et al. |
| 2007/0188417 | A1 | 8/2007 | Hajjar et al. |

FOREIGN PATENT DOCUMENTS

| | | |
|---|---|---|
| CN | 1150583 | 5/2004 |
| CN | 1949328 | 4/2007 |
| CN | 101375234 | 2/2009 |
| CN | 100505825 | 6/2009 |
| EP | 2454632 | 5/2012 |
| JP | 2796684 | 9/1998 |
| KR | 20070120339 | 12/2007 |
| WO | 0237163 | 5/2002 |
| WO | 2007095329 | 8/2007 |

OTHER PUBLICATIONS

Intellectual Property Office, United Kingdom, GB Application No. 1109396.0, Nov. 24, 2014, 2 pages.

*Primary Examiner* — Michelle Chin
(74) *Attorney, Agent, or Firm* — Perkins Coie LLP

(57) ABSTRACT

Systems and techniques for scanning-beam display are provided to use local dimming on the optical energy of at least one optical beam to minimize the non-uniform image brightness across the screen. This local dimming during the beam scanning can be achieved by adjusting optical energy of at least one optical beam during the scanning based on (1) the location of the scanning optical beam and (2) the predetermined distortion information at the location.

10 Claims, 23 Drawing Sheets

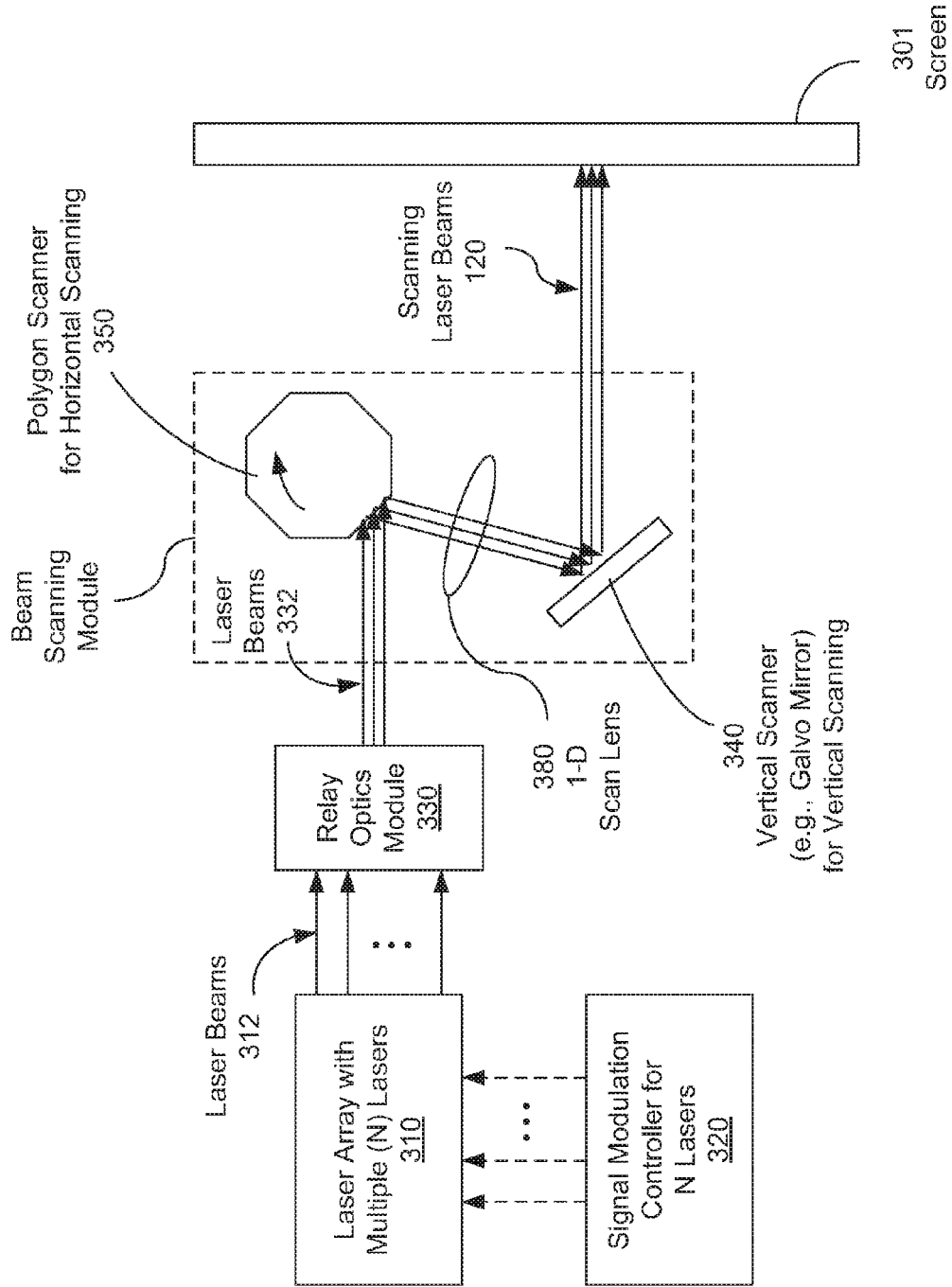

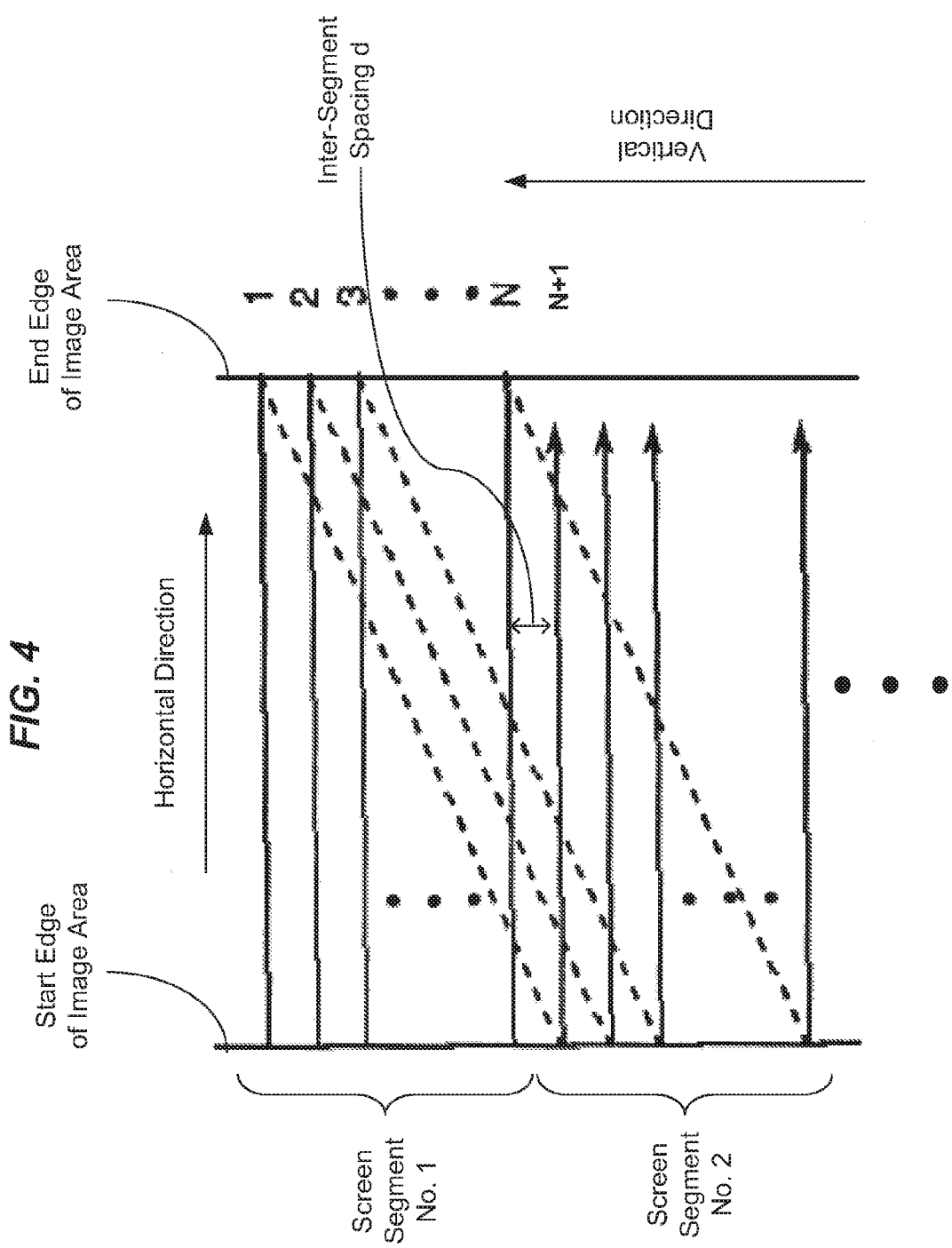

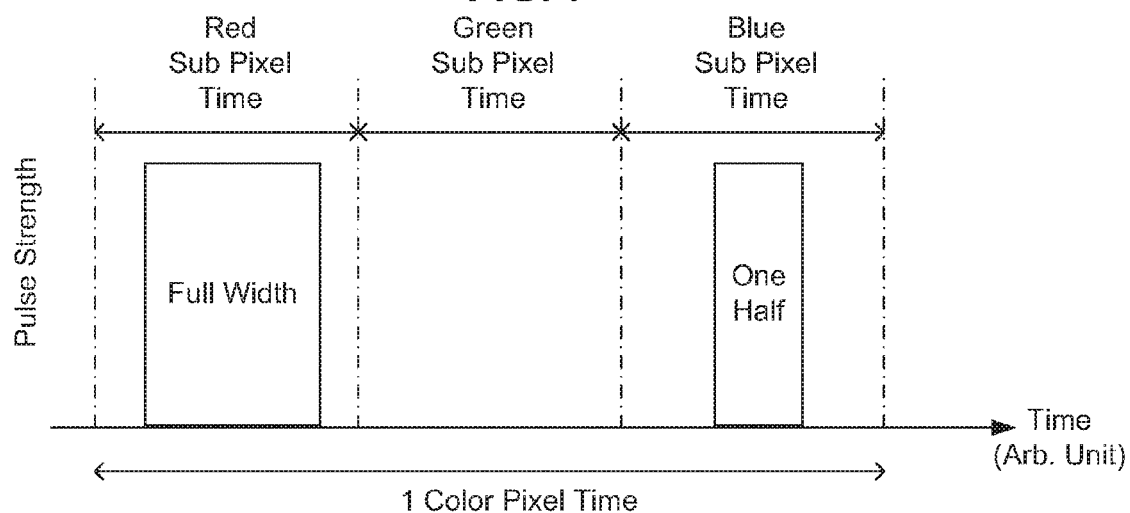
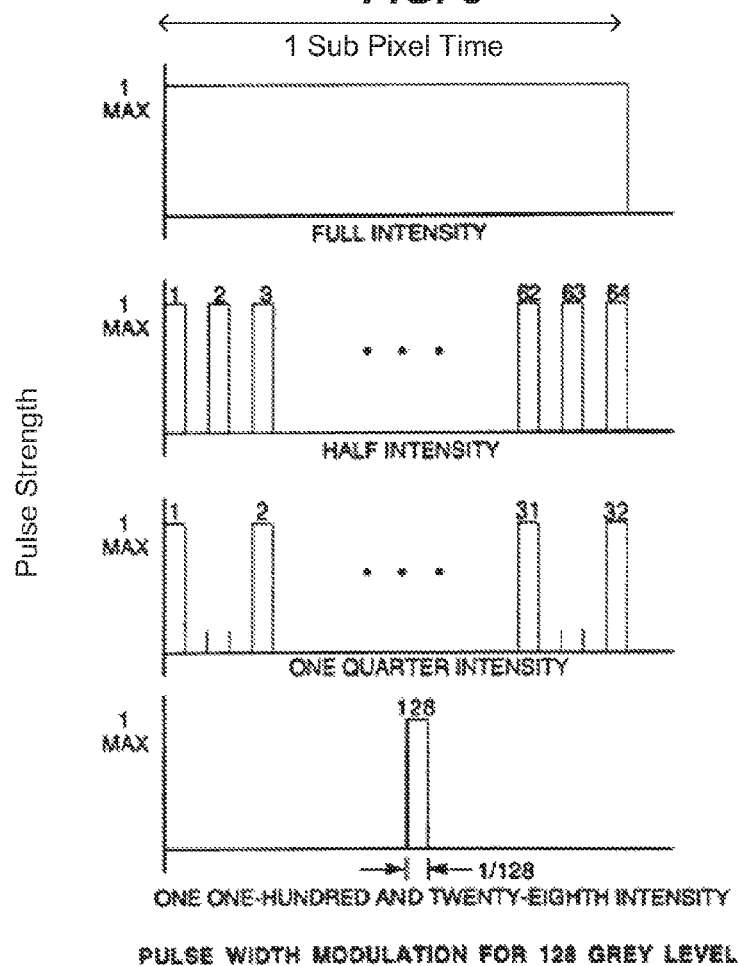

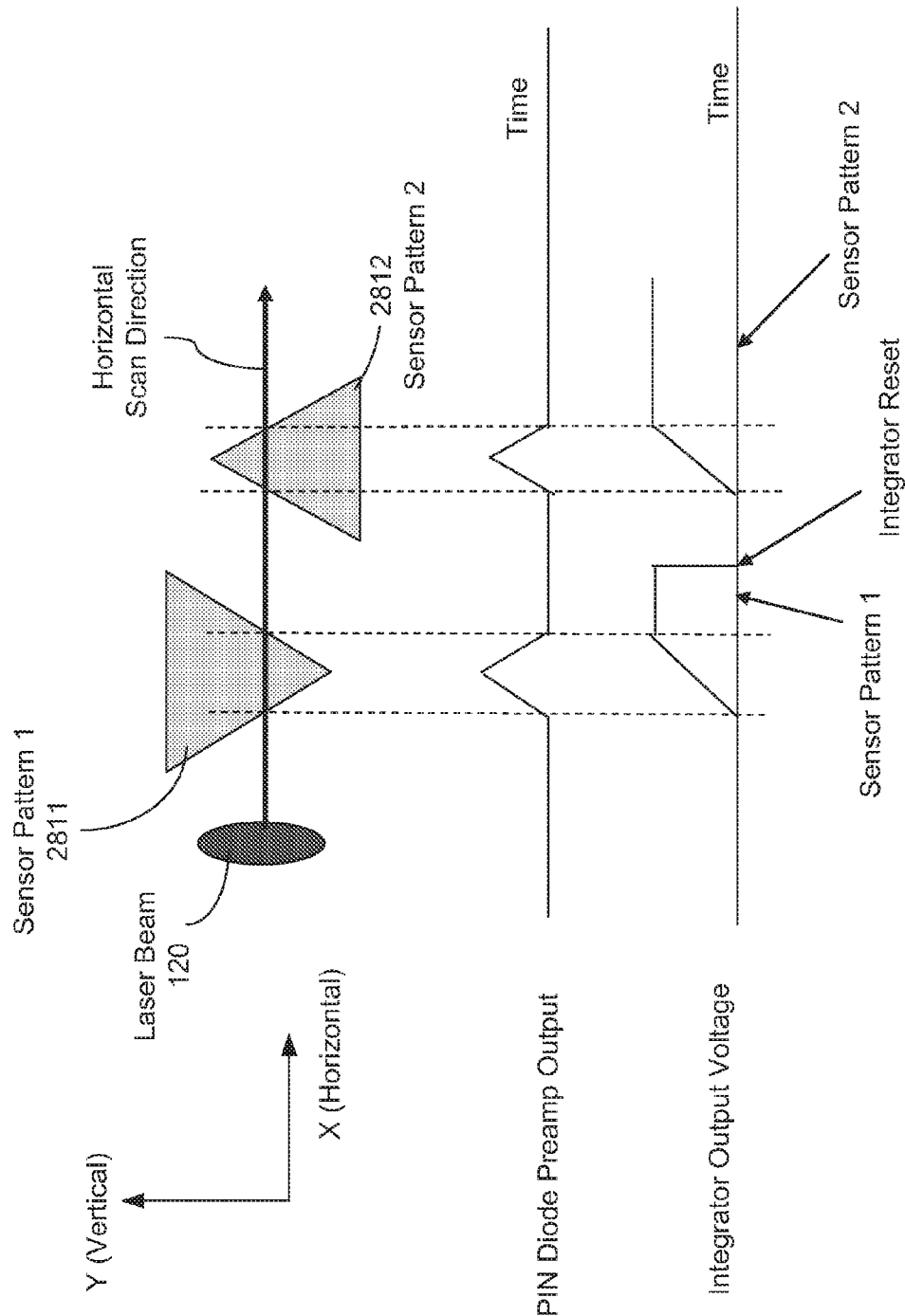

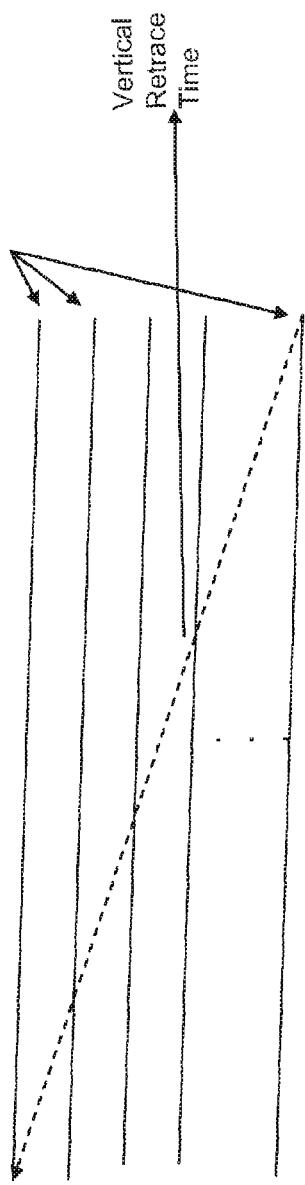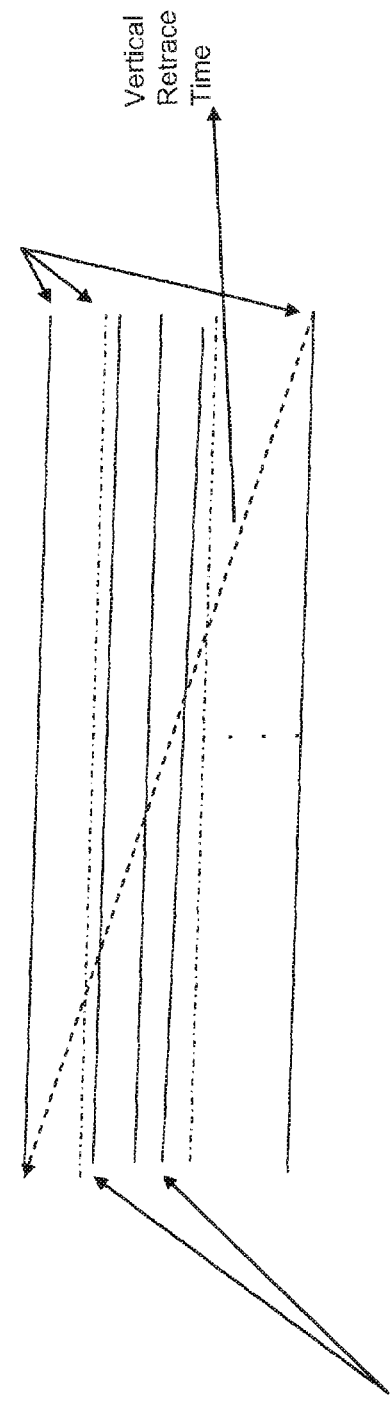

LOCAL DIMMING ON LIGHT-EMITTING SCREENS FOR IMPROVED IMAGE UNIFORMITY IN SCANNING BEAM DISPLAY SYSTEMS

CROSS-REFERENCE TO RELATED APPLICATION

This application is a continuation of and, claims the benefits and priority to, co-pending U.S. patent application Ser. No. 12/796,591, filed on Jun. 8, 2010, published as U.S. Patent Application Publication No. 2011/0298820 A1 on Dec. 8, 2011 and to be issued as U.S. Pat. No. 9,217,862 on Dec. 22, 2015. The entire disclosure of the pending U.S. patent application Ser. No. 12/796,591 and its U.S. Patent Application Publication No. 2011/0298820 A1 are hereby incorporated by reference for all purposes.

BACKGROUND

This patent document relates to display systems that scan one or more optical beams onto a screen to display images.

Display systems can be configured as scanning-beam display systems which scan one or more optical beams that are modulated to carry optical pulses in time domain over a screen in a raster scanning pattern to form images on a screen. Each scanning beam has a small beam footprint that is less than or equal to a subpixel on the screen and the beam footprint scans the sub-pixel and is modulated in optical power or intensity in the time domain to carry images. Raster scanning of such a modulated beam on the screen converts images carried by the sequential optical pulses into spatial patterns as images on the screen.

SUMMARY

Systems and techniques for scanning-beam display are provided to use local dimming on the optical energy of at least one optical beam on a screen to minimize the non-uniform image brightness across the screen. This local dimming during the beam scanning can be achieved by adjusting optical energy of at least one optical beam during the scanning based on (1) the location of the scanning optical beam and (2) the predetermined distortion information at the location.

In one aspect, a method for controlling image displaying in a scanning beam display system can include scanning one or more optical beams of optical pulses onto a screen to display images carried by the optical pulses on the screen; during the scanning, adjusting optical energies of the optical pulses of the one or more optical beams with respect to positions of the one or more scanning optical beams on the screen to render the images on the screen; and, during the scanning, in addition to the adjusting optical energies of the optical pulses for rendering the images, further adjusting optical energies of the optical pulses of at least one optical beam, based on a predetermined spatial variation of the optical beam in connection with a location of the optical beam on the screen caused by one or more distortions in scanning the optical beam onto the screen, to reduce the one or more distortions in the images displayed on the screen.

In another aspect, a display system is provided to include one or more light sources that produce one or more optical beams; a signal modulation controller in communication with the one or more light sources to cause the one or more optical beams to be modulated as optical pulses that carry images to be displayed; a screen that receives the one or more optical beams to display images carried by the optical beams; and an optical scanning module that scans the one or more optical beams onto the screen. The signal modulation controller includes an image data storage device that stores data of the images to be displayed and operates to adjust optical energies of the optical pulses of the one or more optical beams with respect to positions of the one or more scanning optical beams on the screen to render the images on the screen. The signal modulation controller includes a data storage device to store data of a predetermined spatial variation of each optical beam in connection with the location of the optical beam on the screen caused by one or more distortions in scanning the optical beam onto the screen, and the signal modulation controller, in addition to adjusting optical energies of the optical pulses for rendering the images, adjusts optical energies of the optical pulses of at least one optical beam, based on the stored data on the predetermined spatial variation of the optical beam, to reduce the one or more distortions in the images displayed on the screen.

In another aspect, a method is provided for controlling image displaying in a scanning beam display system and includes scanning one or more optical beams of optical pulses onto a screen to display images carried by the optical pulses on the screen, and during the scanning, adjusting optical energies of the optical pulses of the one or more optical beams with respect to positions of the one or more scanning optical beams on the screen to render the images on the screen. Beam spots generated by scanning different optical beams are used to form at least one scan line for forming the images, and wherein different beam spots generated by scanning at least one optical beam are used to form different scan lines for forming the images. During the scanning, in addition to the adjusting optical energies of the optical pulses for rendering the images, this method includes further adjusting optical energies of the optical pulses of one or more optical beams to reduce brightness variation in the images displayed on the screen.

In yet another aspect, a computer storage medium is provided and is encoded with computer instructions that when executed by one or more data processing devices cause the one or more data processing devices to perform operations. The performed operations include causing scanning of one or more optical beams of optical pulses onto a screen to display images carried by the optical pulses on the screen; during the scanning, causing optical energies of the optical pulses of the one or more optical beams to be adjusted with respect to positions of the one or more scanning optical beams on the screen to render the images on the screen; and during the scanning, in addition to the adjusting optical energies of the optical pulses for rendering the images, further causing optical energies of the optical pulses of at least one optical beam to be adjusted, based on a predetermined spatial variation of the optical beam in connection with a location of the optical beam on the screen caused by one or more distortions in scanning the optical beam onto the screen, to reduce the one or more distortions in the images displayed on the screen. In one implementation of this method, the computer instructions cause the one or more data processing devices to perform operations that further include mapping image data of the images to beam spots on the screen based on distortions present in the one or more optical beams to reduce an effect of the distortions.

These and other aspects, associated examples and implementations are described in detail in the drawings, the detailed description and the claims.

BRIEF DESCRIPTION OF THE DRAWINGS

FIGS. 3A, 3B and 3C shows exemplary implementations of the laser module in FIG. 1 having multiple lasers that direct multiple laser beams on the screen.

FIG. 4 illustrates one example of simultaneous scanning of multiple screen segments with multiple scanning laser beams.

FIGS. 5, 6, 7, 8, 9A and 9B show examples of time-domain signal modulations for generating image-carrying optical pulses in each scanning optical beam.

FIGS. 14A and 14B show a servo feedback control circuit and its operation in using the vertical beam position reference mark in FIG. 13 to control the vertical beam position on the screen.

FIGS. 20A and 20B illustrate the effect of the pyramidal errors in the polygon scanner when multiple scanning beams are scanned at the same time as shown in FIG. 4.

DETAILED DESCRIPTION

Figure 1:
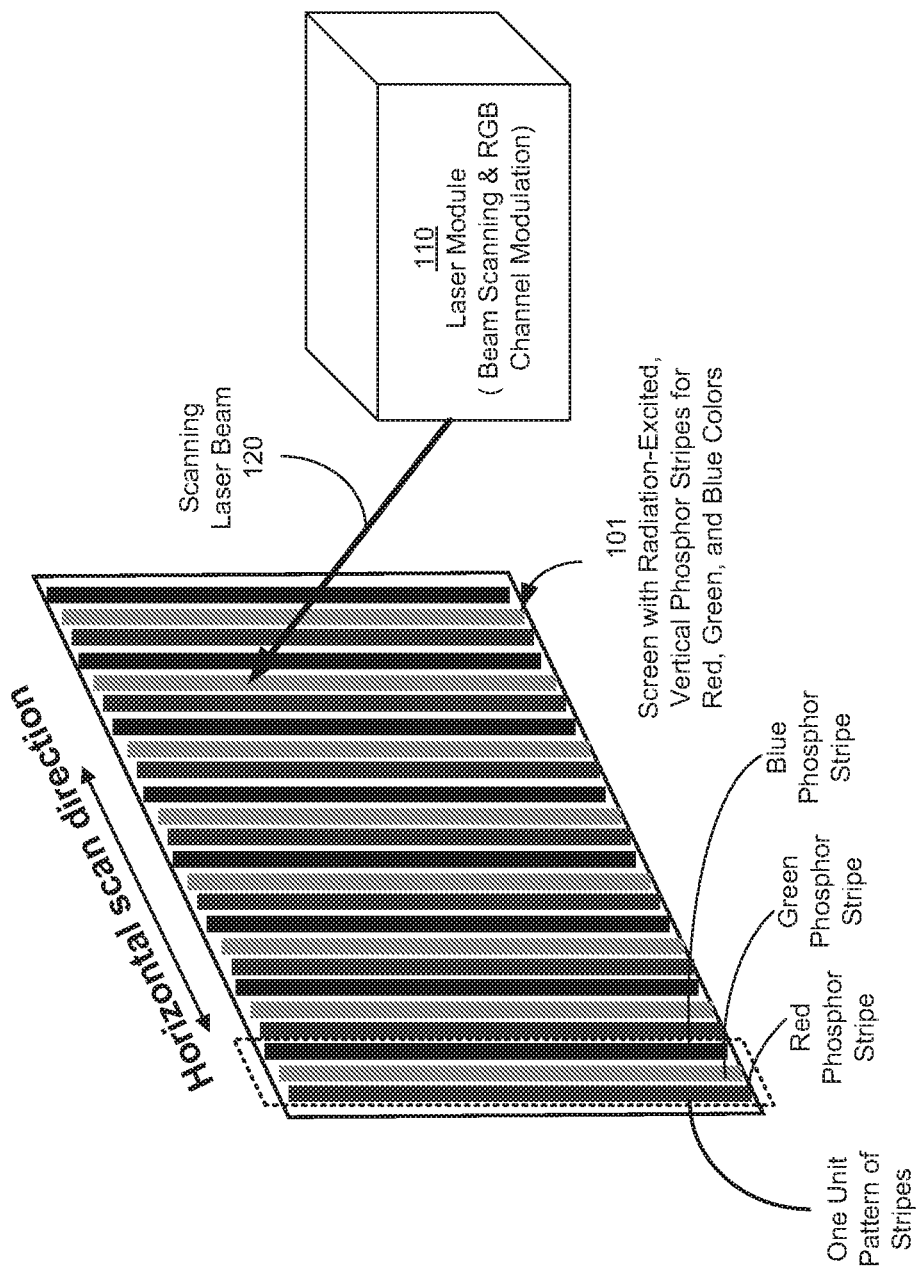
FIG. 1 shows an example scanning laser display system having a fluorescent screen made of laser-excitable phosphors emitting colored lights under excitation of a scanning laser beam that carries the image information to be displayed.

Display systems that scan one or more optical beams onto a screen to display images can be implemented in various configurations.

In some implementations of a scanning beam display system, the screen may be a passive screen that does not emit new light and directly uses the light of the one or more scanning optical beams to form the images by, e.g., reflecting, transmitting, diffusing or scattering the light of the one or more scanning optical beams. In a rear projection mode with red, blue and green beams carrying images respectively in red, green and blue colors, the passive screen receives the red, green and blue beams from one side and diffuses, transmits or scatters the received light to produce colored images for viewing on the other side of the screen.

In other implementations, the screen of such a display system is a light-emitting screen. Light-emitting materials are included in such a screen to absorb the light of the one or more scanning optical beams and to emit new light that forms the images. The light of the one or more scanning optical beams is not directly used in forming the images seen by a viewer. For example, the screen is a light-emitting screen that emits visible light in colors by converting excitation energy applied to the screen into the emitted visible light, e.g., via absorption of excitation light. The emitted visible light forms the images to a viewer. The screen can be implemented to include multiple screen layers, one or more of which have light-emitting components that convert the excitation energy into the emitted visible light that forms the images.

In the above and other implementations, optical scanning modules that perform the raster scanning of the one or more optical beams and optical lenses and other optical components are provided in the optical paths of the one or more optical beams before reaching the screen. Under an ideal operating condition, the raster scanning pattern formed by scanning the one or more optical beams on the screen should be spatially uniform and free of distortions to produce high-quality images. For example, the raster scanning pattern for a flat rectangular shaped wide screen (e.g., with an aspect ratio of 16:9 in many HDTV systems) should be parallel horizontal scanning lines with even spacing along the vertical direction at all locations where the beam spot size on the screen should be a constant at different beam positions on the screen. However, various optical distortions can occur in the optical paths to distort the raster scanning pattern on the screen. For example, the presence of optical scanning modules, optical lenses and other optical components in the optical paths of the one or more optical beams often cause optical distortions. As a result of such distortions, the quality of the displayed images are degraded.

One measure of the image quality is the uniformity of the image brightness across the screen. Human eyes are sensitive to variations of brightness. Therefore, optical distortions that lead to non-uniform image brightness across the screen are significant technical issues in high-quality display systems. Unintended spatial variations in beam spot size and line spacing between adjacent scanning lines on the screen are examples of contributing causes for non-uniform image brightness across the screen.

The scanning-beam display systems and techniques described in this document use local dimming on the optical energy of at least one optical beam to minimize the non-uniform image brightness across the screen. This local dimming during the beam scanning is achieved by adjusting optical energy of at least one optical beam during the scanning based on (1) the location of the scanning optical beam and (2) the predetermined distortion information at the location.

This beam location based adjustment in the optical energy of at least one optical beam during scanning for the local dimming is an additional adjustment to the modulation of the optical energy of each optical beam for rendering the images on the screen. The signal modulation controller that controls optical modulation of each of the one or more optical beams in a display system (1) uses image data to perform a first adjustment on optical energies of the optical pulses of the one or more optical beams with respect to positions of the one or more scanning optical beams on the screen to render the images on the screen, and (2) performs a second adjustment on optical energies of the optical pulses of at least one optical beam, based on a predetermined spatial variation of the optical beam in connection with a location of the optical beam on the screen caused by one or more distortions in scanning the optical beam onto the screen. Both adjustments are location based but provide different image displaying operations: the first adjustment is known as "image modulation" to render the images on the screen, while the second adjustment is to reduce one or more optical distortions in the images displayed on the screen and thus improve the spatial uniformity of the image brightness across the screen.

Specific examples of scanning beam display systems based on light-emitting screens are described below to illustrate the local dimming techniques. The techniques can also be applied to scanning beam display systems based on passive screens.

Scanning beam display systems based on light-emitting screens use screens with light-emitting materials such as fluorescent materials to emit light under optical excitation to produce images. A light-emitting screen can include a pattern of light-emitting regions that emit light for forming images and non-light-emitting regions that are filled in spaces between the light-emitting regions. The designs of the light-emitting regions and non-light-emitting regions can be in various configurations, e.g., one or more arrays of parallel light-emitting stripes, one or more arrays of isolated light-emitting island-like regions or pixel regions, or other design patterns. The geometries of the light-emitting regions can be various shapes and sizes, e.g., squares, rectangles or stripes. Examples described below use a light-emitting screen that has parallel light-emitting stripes separated by non-light-emitting lines located between the light-emitting stripes. Each light-emitting stripe can include a light-emitting material such as a phosphor-containing material that either forms a contiguous stripe line or is distributed in separated regions along the stripe.

In one implementation, for example, three different color phosphors that are optically excitable by the laser beam to respectively produce light in red, green, and blue colors suitable for forming color images may be formed on the screen as pixel dots or repetitive red, green and blue phosphor stripes in parallel. Various examples described in this application use screens with parallel color phosphor stripes for emitting light in red, green, and blue to illustrate various features of the laser-based displays. Phosphor materials are one type of fluorescent materials. Various described systems, devices and features in the examples that use phosphors as the fluorescent materials are applicable to displays with screens made of other optically excitable, light-emitting, non-phosphor fluorescent materials, such as quantum dot materials that emit light under proper optical excitation (semiconductor compounds such as, among others, CdSe and PbS).

Examples of scanning beam display systems described here use at least one scanning laser beam to excite color light-emitting materials deposited on a screen to produce color images. The scanning laser beam is modulated to carry images in red, green and blue colors or in other visible colors and is controlled in such a way that the laser beam excites the color light-emitting materials in red, green and blue colors with images in red, green and blue colors, respectively. Hence, the scanning laser beam carries the images but does not directly produce the visible light seen by a viewer. Instead, the color light-emitting fluorescent materials on the screen absorb the energy of the scanning laser beam and emit visible light in red, green and blue or other colors to generate actual color images seen by the viewer.

Laser excitation of the fluorescent materials using one or more laser beams with energy sufficient to cause the fluorescent materials to emit light or to luminesce is one of various forms of optical excitation. In other implementations, the optical excitation may be generated by a non-laser light source that is sufficiently energetic to excite the fluorescent materials used in the screen. Examples of non-laser excitation light sources include various light-emitting diodes (LEDs), light lamps and other light sources that produce light at a wavelength or a spectral band to excite a fluorescent material that converts the light of a higher energy into light of lower energy in the visible range. The excitation optical beam that excites a fluorescent material on the screen can be at a frequency or in a spectral range that is higher in frequency than the frequency of the emitted visible light by the fluorescent material. Accordingly, the excitation optical beam may be in the violet spectral range and the ultra violet (UV) spectral range, e.g., wavelengths under 420 nm. In the examples described below, UV light or a UV laser beam is used as an example of the excitation light for a phosphor material or other fluorescent material and may be light at other wavelength.

FIG. 1 illustrates an example of a laser-based display system using a screen having color phosphor stripes. Alternatively, color phosphor dots may also be used to define the image pixels on the screen. The system includes a laser module 110 to produce and project at least one scanning laser beam 120 onto a screen 101. The screen 101 has parallel color phosphor stripes in the vertical direction where red phosphor absorbs the laser light to emit light in red, green phosphor absorbs the laser light to emit light in green and blue phosphor absorbs the laser light to emit light in blue. Adjacent three color phosphor stripes are in three different colors. One particular spatial color sequence of the stripes is shown in FIG. 1 as red, green and blue. Other color sequences may also be used. The laser beam 120 is at the wavelength within the optical absorption bandwidth of the color phosphors and is usually at a wavelength shorter than the visible blue and the green and red colors for the color images. As an example, the color phosphors may be phosphors that absorb UV light in the spectral range from about 380 nm to about 420 nm to produce desired red, green and blue light. The laser module 110 can include one or more lasers such as UV diode lasers to produce the beam 120, a beam scanning mechanism to scan the beam 120 horizontally and vertically to render one image frame at a time on the screen 101, and a signal modulation mechanism to modulate the beam 120 to carry the information for image channels for red, green and blue colors. Such display systems may be configured as rear projection systems where the viewer and the laser module 110 are on the opposite sides of the screen 101. Alternatively, such display systems may be configured as front projection systems where the viewer and laser module 110 are on the same side of the screen 101.

Figure 2A:
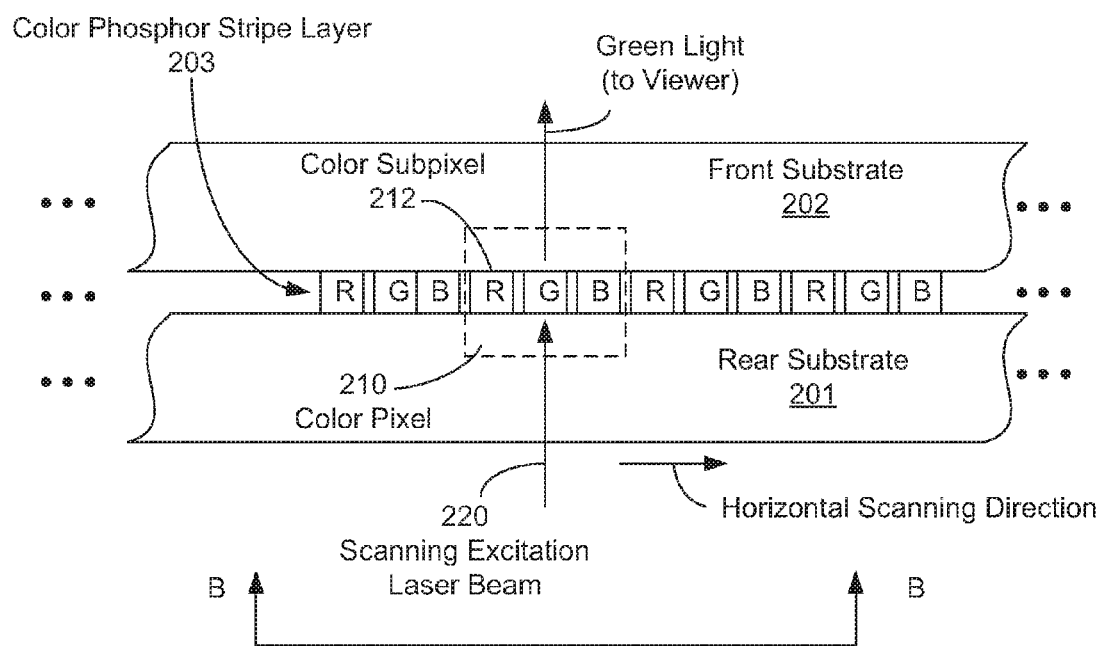
FIGS. 2A and 2B show one example screen structure and the structure of color pixels on the screen in FIG. 1.

FIG. 2A shows an exemplary design of the screen 101 in FIG. 1. The screen 101 may include a rear substrate 201 which is transparent to the scanning laser beam 120 and faces the laser module 110 to receive the scanning laser beam 120. A second front substrate 202, is fixed relative to the rear substrate 201 and faces the viewer in a rear projection configuration. A color phosphor stripe layer 203 is placed between the substrates 201 and 202 and includes phosphor stripes. The color phosphor stripes for emitting red, green and blue colors are represented by "R", "G" and "B," respectively. The front substrate 202 is transparent to the red, green and blue colors emitted by the phosphor stripes. The substrates 201 and 202 may be made of various materials, including glass or plastic panels. Each color pixel includes portions of three adjacent color phosphor stripes in the horizontal direction and its vertical dimension is defined by the beam spread of the laser beam 120 in the vertical direction. As such, each color pixel includes three subpixels of three different colors (e.g., the red, green and blue). The laser module 110 scans the laser beam 120 one horizontal line at a time, e.g., from left to right and from top to bottom to fill the screen 101. The laser module 110 is fixed in position relative to the screen 101 so that the scanning of the beam 120 can be controlled in a predetermined manner to ensure proper alignment between the laser beam 120 and each pixel position on the screen 101.

Figure 2B:
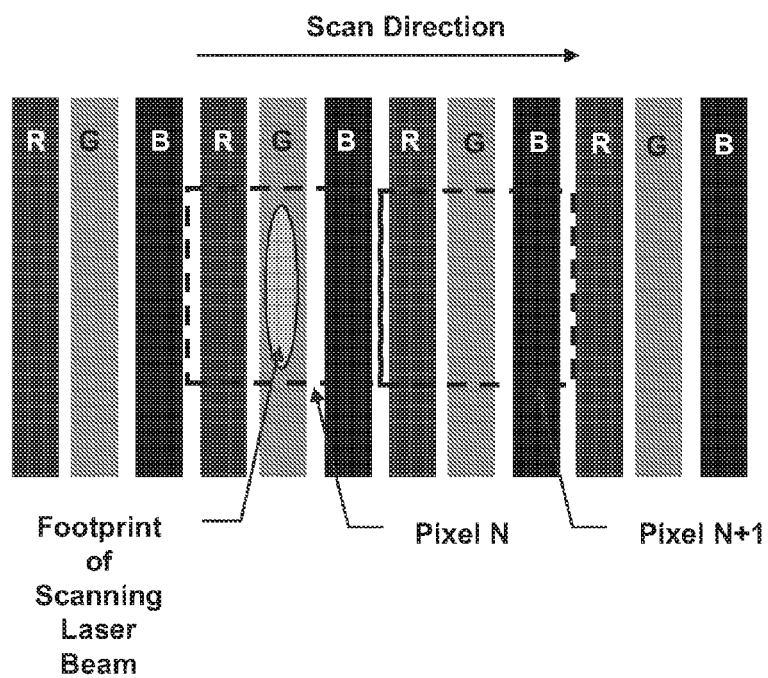

In FIG. 2A, the scanning laser beam 120 is directed at the green phosphor stripe within a pixel to produce green light for that pixel. FIG. 2B further shows the operation of the screen 101 in a view along the direction B-B perpendicular to the surface of the screen 101. Since each color stripe is longitudinal in shape, the cross section of the beam 120 may be shaped to be elongated along the direction of the stripe to maximize the fill factor of the beam within each color stripe for a pixel. This may be achieved by using a beam shaping optical element in the laser module 110. A laser source that is used to produce a scanning laser beam that excites a phosphor material on the screen may be a single mode laser or a multimode laser. The laser may also be a single mode along the direction perpendicular to the elongated direction phosphor stripes to have a small beam spread that is confined by the width of each phosphor stripe. Along the elongated direction of the phosphor stripes, this laser beam may have multiple modes to spread over a larger area than the beam spread in the direction across the phosphor stripe. This use of a laser beam with a single mode in one direction to have a small beam footprint on the screen and multiple modes in the perpendicular direction to have a larger footprint on the screen allows the beam to be shaped to fit the elongated color subpixel on the screen and to provide sufficient laser power in the beam via the multimodes to ensure sufficient brightness of the screen.

Figure 3A:
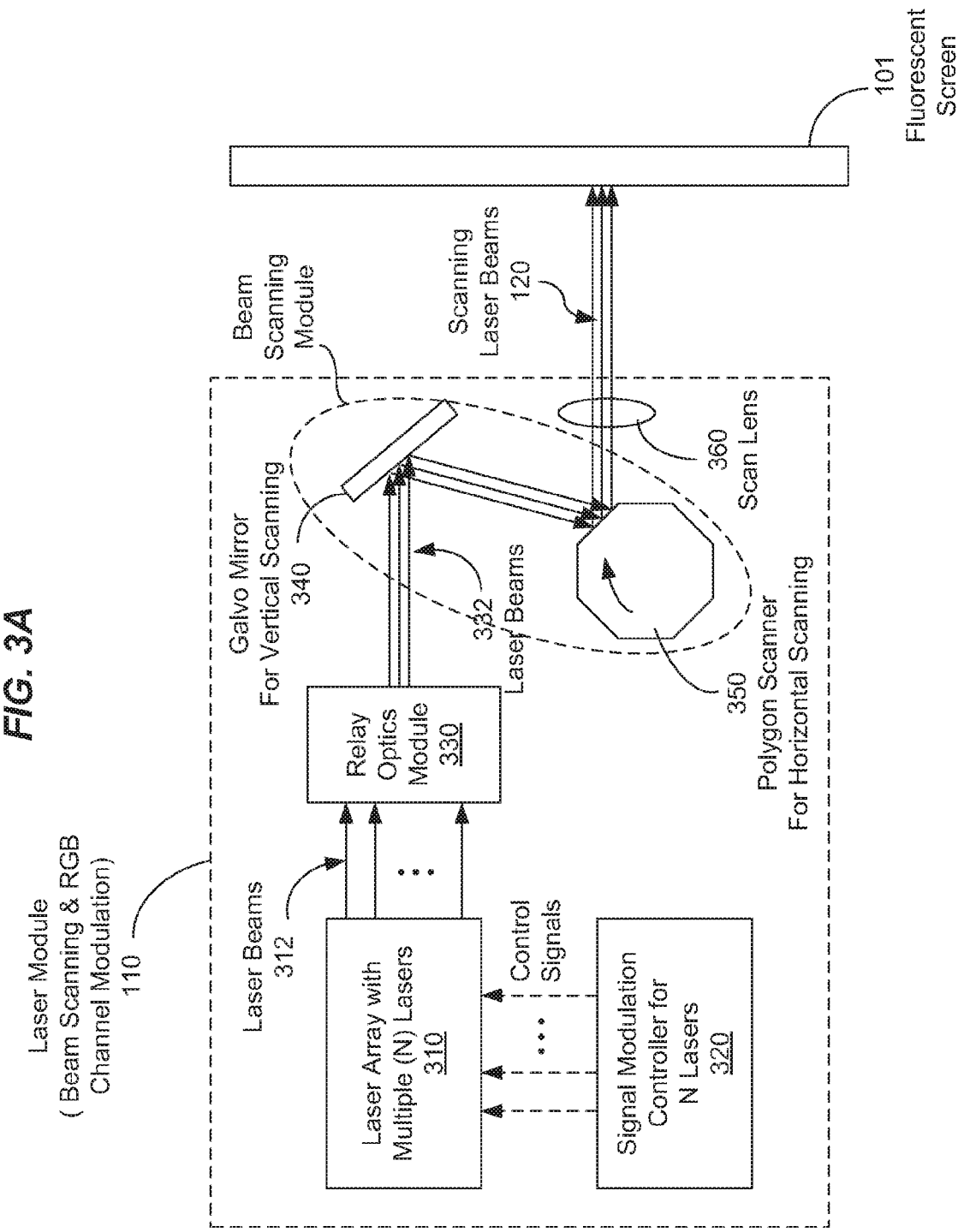
Figure 3B:
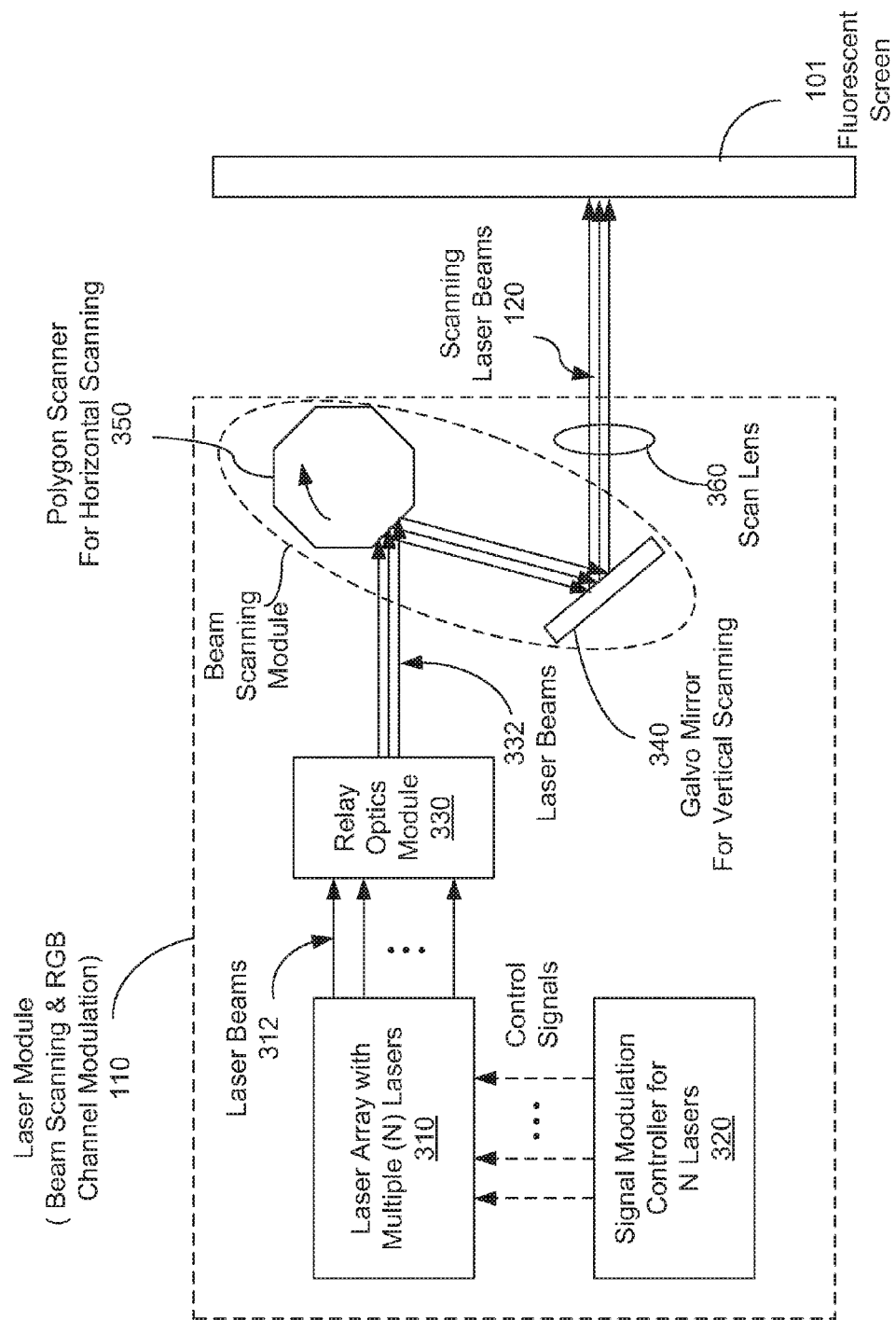

FIGS. 3A and 3B show two examples of the laser module 110 in FIG. 1. A laser array 310 with multiple lasers is used to generate multiple laser beams 312 to simultaneously scan the screen 101 for enhanced display brightness. The laser array 310 can be implemented in various configurations, such as discrete laser diodes on separate chips arranged in an array and a monolithic laser array chip having integrated laser diodes arranged in an array. A signal modulation controller 320 is provided to control and modulate the lasers in the laser array 310 so that the laser beams 312 are modulated to carry the image to be displayed on the screen 101. The signal modulation controller 320 can include a digital image processor that generates digital image signals for the three different color channels and laser driver circuits that produce laser control signals carrying the digital image signals. The laser control signals are then applied to modulate the lasers, e.g., the currents for laser diodes, in the laser array 310.

The beam scanning is achieved by using a scanning module which can include, for example, a scanning mirror 340 such as a galvo mirror for the vertical scanning and a multi-facet polygon scanner 350 for the horizontal scanning. In FIG. 3A, the galvo mirror scanner 340 is upstream to the polygon scanner 350. In FIG. 3B, the galvo mirror scanner 340 is downstream to the polygon scanner 350. In both designs, a scan lens 360 is used to project the scanning beams form the polygon scanner 350 onto the screen 101. The scan lens 360 is designed to image each laser in the laser array 310 onto the screen 101. Each of the different reflective facets of the polygon scanner 350 simultaneously scans N horizontal lines where N is the number of lasers. In the illustrated example, the laser beams are first directed to the galvo mirror 340 and then from the galvo mirror 340 to the polygon scanner 350. The output scanning beams 120 are then projected onto the screen 101. A relay optics module 330 is placed in the optical path of the laser beams 312 to modify the spatial property of the laser beams 312 and to produce a closely packed bundle of beams 332 for scanning by the galvo mirror 340 and the polygon scanner 350 as the scanning beams 120 projected onto the screen 101 to excite the phosphors and to generate the images by colored light emitted by the phosphors.

In other implementations, the one or more scanners described in the above examples may be replaced with one or more resonant scanners or micro mechanical electrical system (MEMS) devices to scan the beams. These devices may scan the beam in at least one direction, where adding additional resonant scanners or MEMS devices may support driving a beam in a second direction. In yet implementations, a DLP (Digital Light Processor) may be employed to support directing a scanned beam to a screen.

The laser beams 120 are scanned spatially across the screen 101 to hit different color pixels at different times. Accordingly, each of the modulated beams 120 carries the image signals for the red, green and blue colors for each pixel at different times and for different pixels at different times. Hence, the beams 120 are coded with image information for different pixels at different times by the signal modulation controller 320. The beam scanning thus maps the time-domain coded image signals in the beams 120 onto the spatial pixels on the screen 101. For example, the modulated laser beams 120 can have each color pixel time equally divided into three sequential time slots for the three color subpixels for the three different color channels. The modulation of the beams 120 may use pulse modulation techniques to produce desired grey scales in each color, a proper color combination in each pixel, and desired image brightness.

In one implementation, the multiple beams 120 are directed onto the screen 101 at different and adjacent vertical positions with two adjacent beams being spaced from each other on the screen 101 by one horizontal line of the screen 101 along the vertical direction. For a given position of the galvo mirror 340 and a given position of the polygon scanner 350, the beams 120 may not be aligned with each other along the vertical direction on the screen 101 and may be at different positions on the screen 101 along the horizontal direction. The beams 120 can only cover one portion of the screen 101. At a fixed angular position of the galvo mirror 340, the spinning of the polygon scanner 350 causes the beams 120 from N lasers in the laser array 310 to scan one screen segment of N adjacent horizontal lines on the screen 101. At the end of each horizontal scan over one screen segment, the galvo mirror 340 is adjusted to a different fixed angular position so that the vertical positions of all N beams 120 are adjusted to scan the next adjacent screen segment of N horizontal lines. This process iterates until the entire screen 101 is scanned to produce a full screen display.

FIG. 3C shows an example implementation of a post-objective scanning beam display system based on the system design in FIG. 1. In this design, the relay optics module 330 reduces the spacing of laser beams 312 to form a compact set of laser beams 332 that spread within the facet dimension of the polygon scanner 350 for the horizontal scanning. Downstream from the polygon scanner 350, there is a 1-D horizontal scan lens 380 followed by a vertical scanner 340 (e.g., a galvo mirror) that receives each horizontally scanned beam 332 from the polygon scanner 350 through the 1-D scan lens 380 and provides the vertical scan on each horizontally scanned beam 332 at the end of each horizontal scan prior to the next horizontal scan by the next facet of the polygon scanner 350. Notably, the 1-D scan lens 380 is placed downstream from the polygon scanner 350 and upstream from the vertical scanner 340 to focus each horizontal scanned beam on the screen 101 and minimizes the horizontal bow distortion to displayed images on the screen 101. Such a 1-D scan lens 380 capable of producing a straight horizontal scan line is relatively simpler and less expensive than a 2-D scan lens of similar performance. Downstream from the scan lens 380, the vertical scanner 340 is a flat reflector and simply reflects the beam to the screen 101 and scans vertically to place each horizontally scanned beam at different vertical positions on the screen 101 for scanning different horizontal lines. The dimension of the reflector on the vertical scanner 340 along the horizontal direction is sufficiently large to cover the spatial extent of each scanning beam coming from the polygon scanner 350 and the scan lens 380.

Beam scanning can be performed in various ways by the scanning module. FIG. 4 illustrates an example of simultaneous scanning of one screen segment with multiple scanning laser beams at a time and sequentially scanning consecutive screen segments. Visually, the beams 120 behaves like a paint brush to "paint" one thick horizontal stroke across the screen 101 at a time to cover one screen segment and then subsequently to "paint" another thick horizontal stroke to cover an adjacent vertically shifted screen segment. Assuming the laser array 310 has 36 lasers, a 1080-line progressive scan of the screen 101 would require scanning 30 vertical screen segments for a full scan. Hence, this configuration in an effect divides the screen 101 along the vertical direction into multiple screen segments so that the N scanning beams scan one screen segment at a time with each scanning beam scanning only one line in the screen segment and different beams scanning different sequential lines in that screen segment. After one screen segment is scanned, the N scanning beams are moved at the same time to scan the next adjacent screen segment.

In the above design with multiple laser beams, each scanning laser beam scans only a number of lines across the entire screen along the vertical direction that is equal to the number of screen segments, and, within each screen segment, several beams simultaneously scan multiple lines. Hence, the polygon scanner for the horizontal scanning can operate at a slower speed than a scanning speed needed for a single beam scan design that uses the single beam to scan every line of the entire screen. For a given number of total horizontal lines on the screen (e.g., 1080 lines in HDTV), the number of screen segments decreases as the number of the lasers increases. Hence, with 36 lasers, the galvo mirror 340 and the polygon scanner 350 scan 30 lines per frame while a total of 108 lines per frame are scanned when there are only 10 lasers. Hence, the use of the multiple lasers can increase the image brightness which is approximately proportional to the number of lasers used and, at the same time, can also advantageously reduce the response speeds of the scanning module.

The vertical beam pointing accuracy is controlled within a threshold in order to produce a high quality image. When multiple scanning beams are used to scan multiple screen segments, this accuracy in the vertical beam pointing should be controlled to avoid or minimize an overlap between two adjacent screen segments because such an overlap in the vertical direction can severely degrade the image quality. The vertical beam pointing accuracy should be less than the width of one horizontal line in implementations.

In the above scanning beam systems, each of the one or more laser beams 120 is scanned spatially across the light-emitting screen 101 to hit different color pixels at different times. Accordingly, the modulated beam 120 carries the image signals for the red, green and blue for each pixel at different times and for different pixels at different times. Hence, the modulation of the beam 120 is coded with image information for different pixels at different times to map the timely coded image signals in the beam 120 to the spatial pixels on the screen 101 via the beam scanning. The beam scanning converts the timely coded image signals in form of optical pulses into spatial patterns as displayed images on the screen 101.

Figure 5:
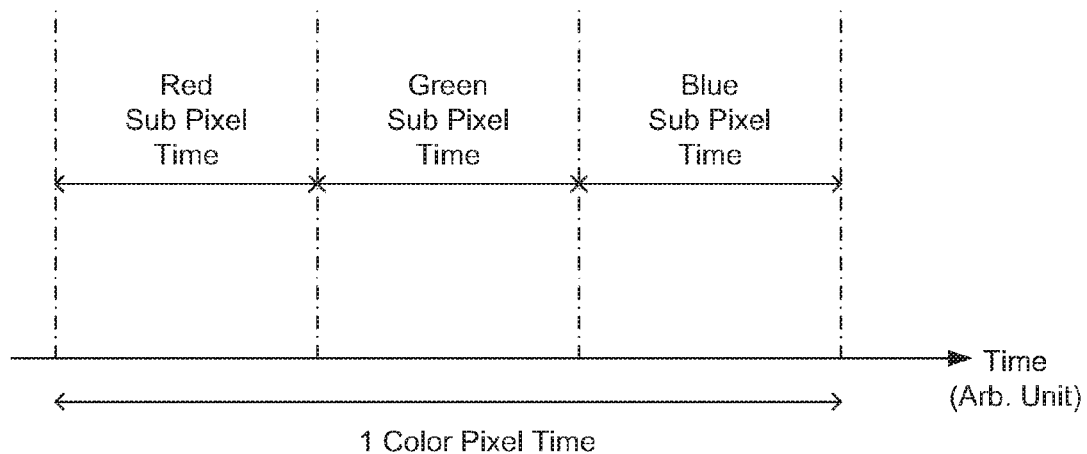

FIG. 5 shows one example for time division on the modulated laser beam 120 where each color pixel time is equally divided into three sequential time slots for the three color channels. The modulation of the beam 120 may use pulse modulation techniques to produce desired grey scales in each color, proper color combination in each pixel, and desired image brightness.

Figure 6:
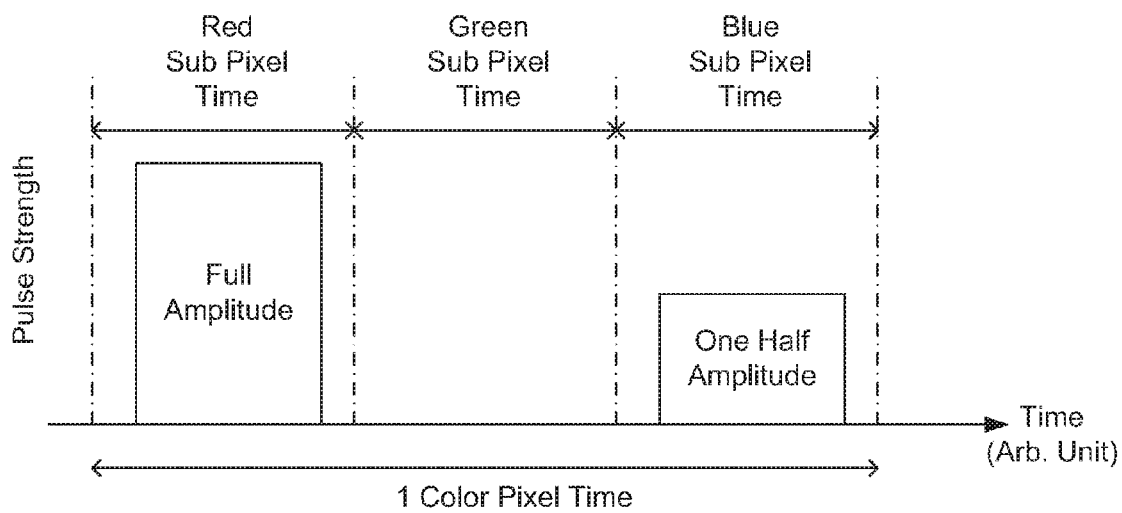

FIGS. 6, 7, 8, 9A and 9B illustrate examples of some pulse modulation techniques. FIG. 6 shows an example of a pulse amplitude modulation (PAM) where the amplitude of the optical pulse in each time slot produces the desired grey scale and color when combined with other two colors within the same pixel. In the illustrated example, the pulse during the red sub pixel time is at its full amplitude, the pulse during the green sub pixel time is zero, and the pulse during the blue sub pixel time is one half of the full amplitude. PAM is sensitive to noise. As an improvement to PAM, a pulse code modulation (PCM) may be used where the amplitude values of the pulse are digitized. PCM is widely used in various applications.

FIG. 7 shows another pulse modulation technique where each pulse is at a fixed amplitude but the pulse width or duration is changed or modulated to change the total energy of light in each color sub pixel. The illustrated example in FIG. 8 for the pulse width modulation (PWM) shows a full width pulse in red, no pulse in green and a pulse with one half of the full width in blue.

FIG. 8 illustrates another example of the PWM for producing N (e.g., N=128) grey scales in each color sub pixel. Each pixel time is equally divided into N time slots. At the full intensity, a single pulse for the entire duration of the sub pixel time at the full amplitude is produced. To generate the one half intensity, only 64 pulses with the full amplitude in alternating time slots, 1, 3, 5, 7, . . . , 127 are generated with the sub pixel time. This method of using equally spaced pulses with a duration of 1/N of the sub pixel time can be used to generate a total of 128 different grey levels. For practical applications, the N may be set at 256 or greater to achieve higher grey levels.

Figure 9A:
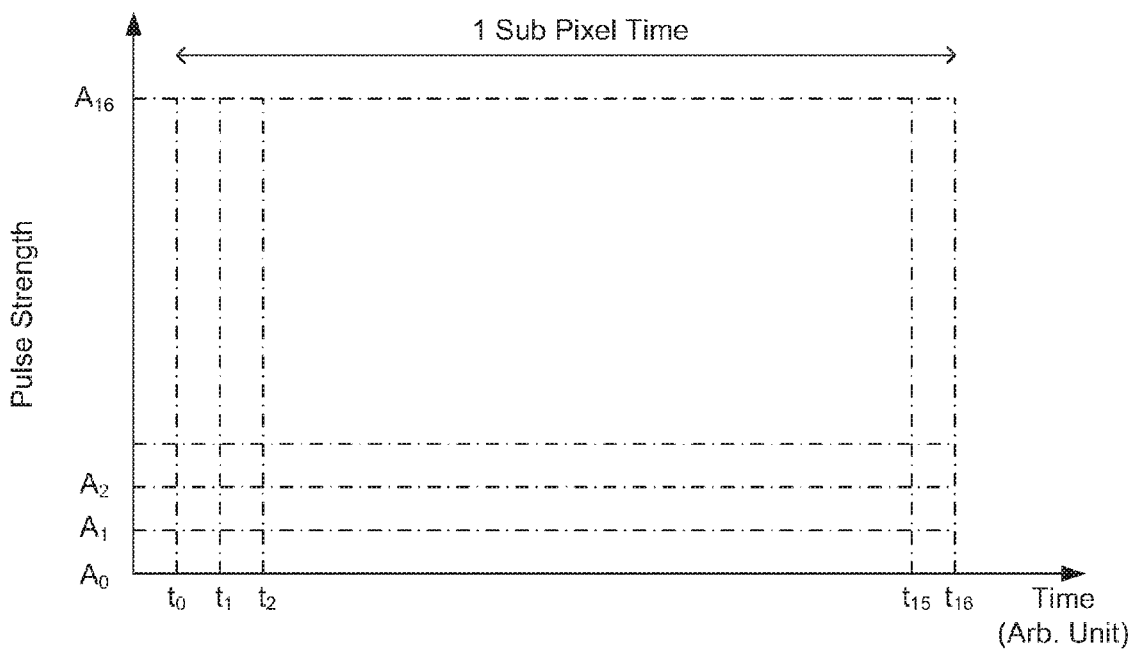
Figure 9B:
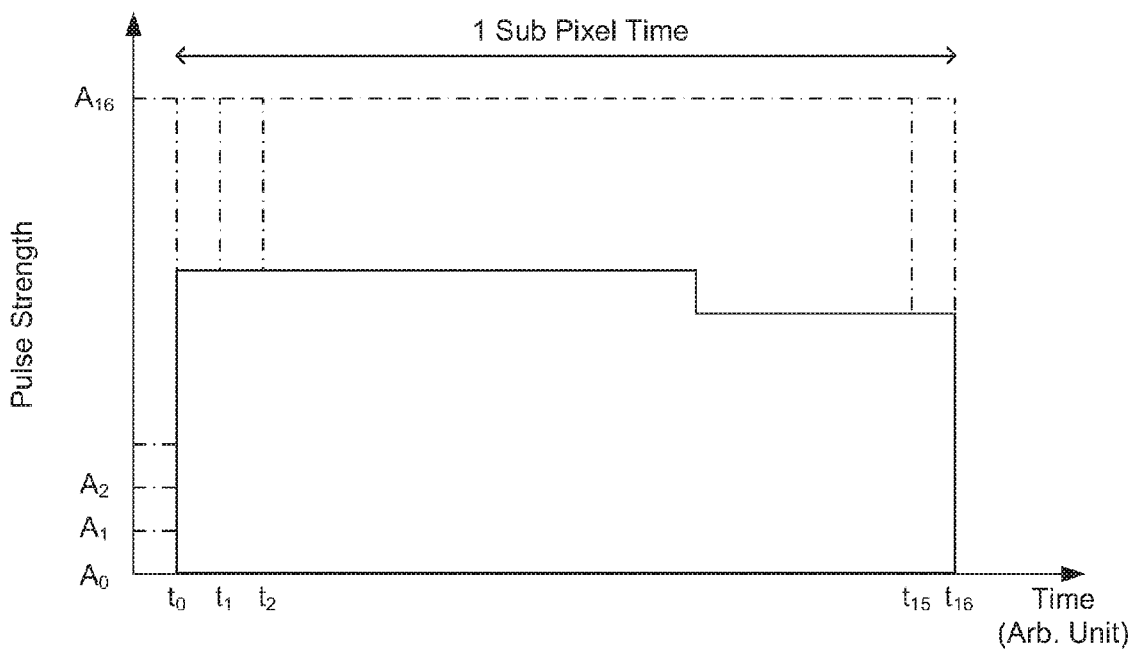

FIGS. 9A and 9B illustrate another example of a pulse modulation technique that combines both the PCM and PWM to produce N grey scales. In the PCM part of this modulation scheme, the full amplitude of the pulse is divided into M digital or discrete levels and the full sub pixel time is divided into multiple equal sub pulse durations, e.g., M sub pulse durations. The combination of the PCM and PWD is N=M×M grey scales in each color sub pixel. As an example, FIG. 9A shows that a PCM with 16 digital levels and a PWM with 16 digital levels. In implementation, a grey scale may be achieved by first filling the pulse positions at the lowest amplitude level A1. When all 16 time slots are used up, the amplitude level is increased by one level to A2 and then the time slots sequentially filled up. FIG. 9B shows one example of a color sub pixel signal according to this hybrid modulation based on PCM and PWM. The above hybrid modulation has a number of advantages. For example, the total number of the grey levels is no longer limited by the operating speed of the electronics for PCM or PWM alone.

The above signal coding techniques, PAM, PCM and PWM, and their combinations, or other suitable signal coding techniques, can be applied to a scanning beam display system that scans colored red, green and blue beams onto a passive screen for displaying colored images.

The present local dimming during the beam scanning can adjust signal parameters in the above signal coding techniques in adjusting the optical energy of at least one optical beam during the scanning based on (1) the location of the scanning optical beam and (2) the predetermined distortion information at the location. For example, either or both of the optical pulse amplitude and pulse width in time can be adjusted to adjust the optical energy in achieving the local dimming for improved uniform image brightness across the screen.

Figure 10:
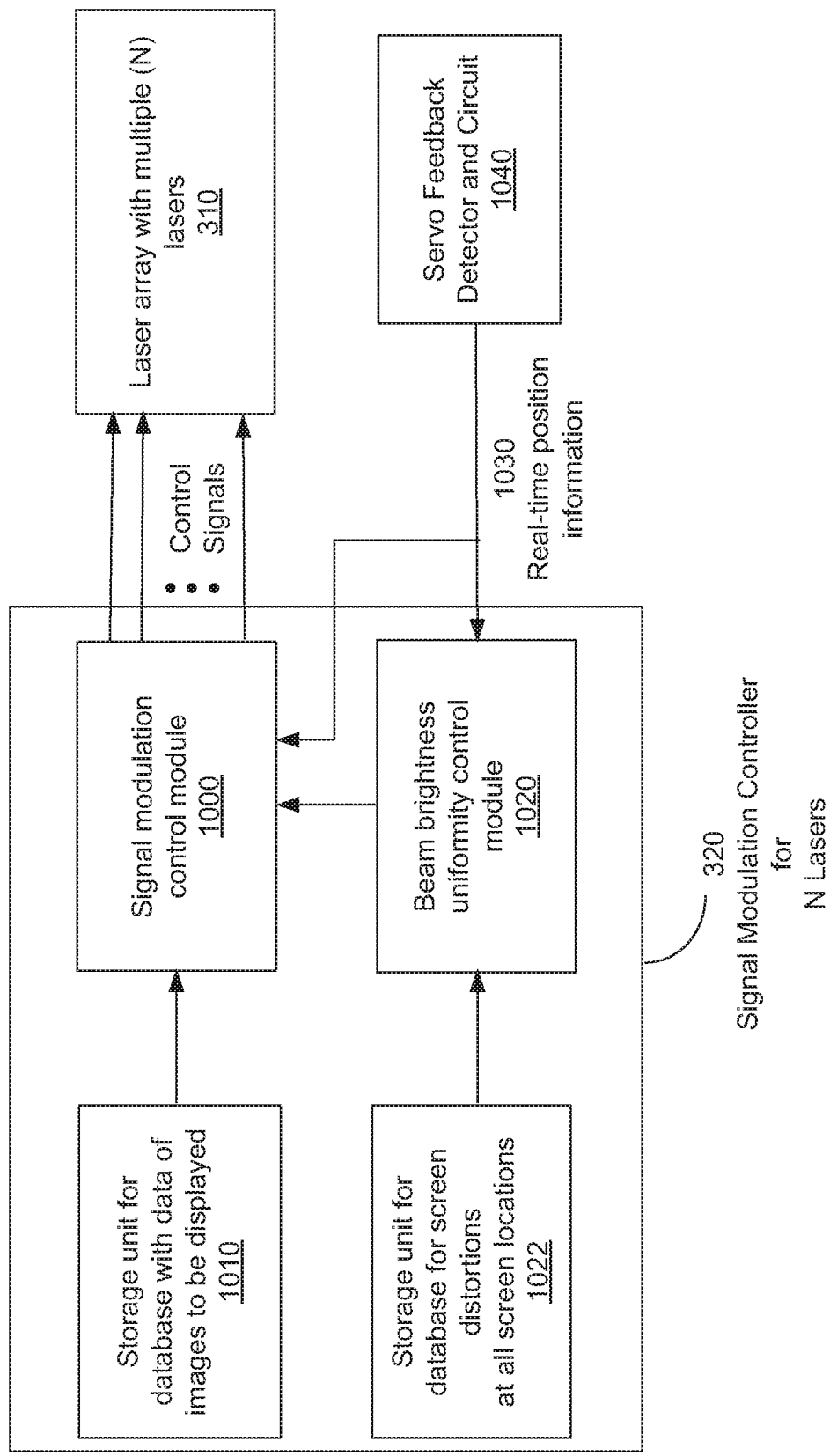
FIG. 10 shows an example of the signal modulation controller for controlling optical modulation of lasers in a scanning beam display system to provide beam brightness uniformity control.

FIG. 10 shows one example of the signal modulation controller 320. The controller 320 in this example includes a storage unit 1010 for storing a database with data of images to be displayed by the system, a storage unit 1022 for storing a database for screen distortions at all screen locations, a beam brightness uniformity control module 1020 and a signal modulation control module 1000. The storage unit 1010 receives the image data from the an image source, e.g., a video disk player such as a DVD or BluRay layer, a TV input from a cable or satellite service, or an input from a communication network source such as the Internet, a wireless network or others. The storage unit 1010 may be constantly updated with new incoming image data. The signal modulation control signal module 1010 applies the image data to generate the control signals based on a proper signal coding technique to control optical modulation of the laser beams generated by the lasers in the array 310. The storage 1022 stores data on screen distortions at all screen locations. This data can be obtained by mapping the images on the screen during fabrication phase of the system and may be updated at a later time, e.g., during a service event. The uniformity control module 1020 combines the data on screen distortions and the real-time beam location information 1030 to generate uniformity control signals for adjusting the optical energies of the optical pulses for improving the image uniformity. The uniformity control signals are fed to the signal modulation control module 1000 which combines the uniformity control signals with the control signals based on a proper signal coding technique to control optical modulation of the laser beams. Therefore, two location based adjustments are carried out by the signal modulation controller 320: the image modulation based on the image data to render the images on the screen and the brightness uniformity control based on the screen distortion data.

The real-time position information 1030 of the one or more optical beams 120 can be obtained via various techniques. One example is to generate optical feedback light in real time by each scanning optical beam 120 via one or more optical reference marks on the screen to produce the optical feedback light. A designated optical detector located off the screen can be used to collect the optical feedback light and to convert the collected optical feedback light into a detector signal that contains the real-time position information 1030. In FIG. 10, a servo feedback detector and circuit module 1040 is shown to illustrate this feature. This information is then fed to the signal modulation controller 320.

Examples of optical reference marks for the screen 101 are described below.

Alignment reference marks can be implemented on the screen 101 to determine the relative position of the beam on the screen and other parameters of the excitation beam on the screen. For example, during a horizontal scan of the excitation beam 120 across the fluorescent stripes, a start of line (SOL) mark can be provided for the system to determine the beginning of the active fluorescent display area of the screen 101 so that the signal modulation controller of the system can begin deliver optical pulses to the targeted pixels. An end of line (EOL) mark can also be provided for the system to determine the end of the active fluorescent display area of the screen 101 during a horizontal scan. For another example, a vertical alignment referenced mark can be provided for the system to determine whether the beam 120 is pointed to a proper vertical location on the screen. Other examples for reference marks may be one or more reference marks for measuring the beam spot size on the screen and one or more reference marks on the screen to measure the optical power of the excitation beam 120. Such reference marks can be placed a region outside the active fluorescent area of the screen 101, e.g., in one or more peripheral regions of the active fluorescent screen area.

Figure 11:
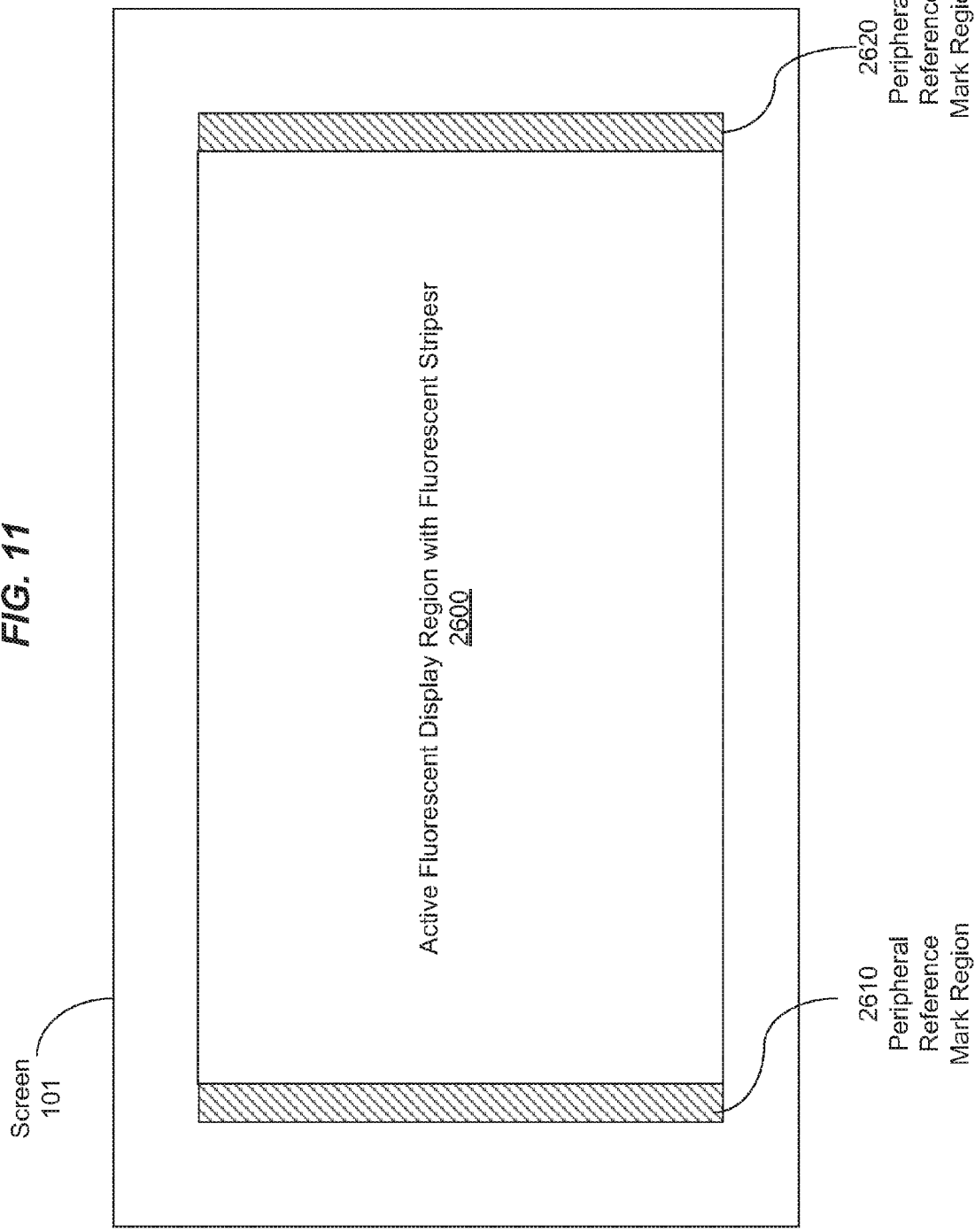
FIG. 11 shows an example of a fluorescent screen having peripheral reference mark regions that include servo reference marks that produce feedback light for various servo control functions.

FIG. 11 illustrates one example of a fluorescent screen 101 having peripheral reference mark regions. The screen 101 includes a central active fluorescent area 2600 with parallel fluorescent stripes for displaying images, two stripe peripheral reference mark regions 2610 and 2620 that are parallel to the fluorescent stripes. Each peripheral reference mark region can be used to provide various reference marks for the screen 101. In some implementations, only the left peripheral reference mark region 2610 is provided without the second region 2620 when the horizontal scan across the fluorescent stripes is directed from the left to the right of the area 2600. The reference mark features described here can also be applied to passive screens which do not have the light-emitting materials where the central active fluorescent area 2600 in FIG. 11 is simply the central passive area of a passive screen.

Such a peripheral reference mark region on the screen 101 allows the scanning display system to monitor certain operating parameters of the system. Notably, because a reference mark in the peripheral reference mark region is outside the active fluorescent display area 2600 of the screen 101, a corresponding servo feedback control function can be performed outside the duration during the display operation when the excitation beam is scanning through the active fluorescent display area 2600 to display image. Therefore, a dynamic servo operation can be implemented without interfering the display of the images to the viewer. In this regard, each scan can include a CW mode period when an excitation beam sans through the peripheral referenced mark region for the dynamic servo sensing and control and a display mode period when the modulation of the excitation beam is turned on to produce image-carrying optical pulses as the excitation beam sans through the active fluorescent display area 2600. Referring back to FIG. 10, the signal modulation control module 1000 uses the real-time position information 1030 from the servo feedback detector and circuit module 1040 to provide the timing information for the signal modulation control module 1000 and the beam brightness uniformity control module 1020.

Figure 12:
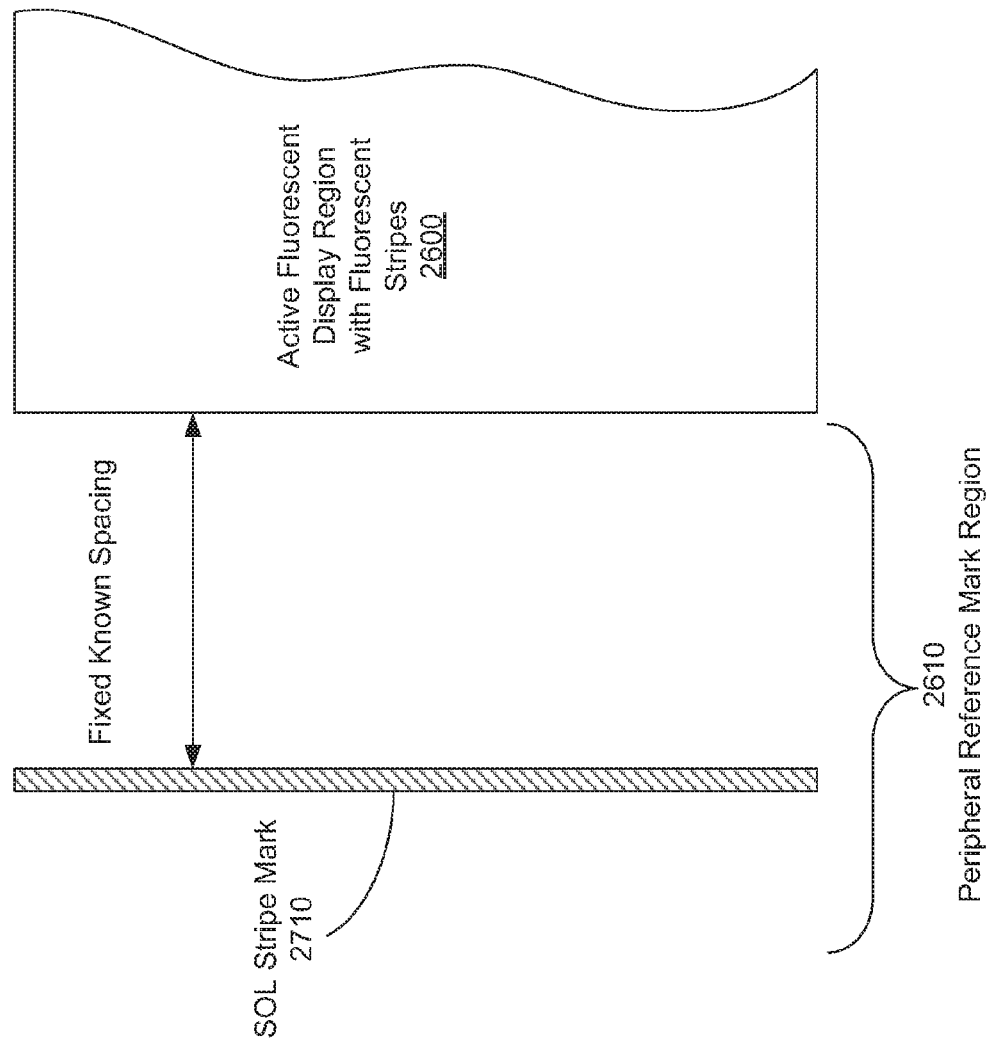
FIG. 12 shows a start of line reference mark in a peripheral reference mark region to provide a reference for the beginning of the active fluorescent area on the screen.

FIG. 12 shows an example of a start of line (SOL) reference mark 2710 in the left peripheral region 2610 in the screen 101. The SOL reference mark 2710 can be an optically reflective, diffusive or fluorescent stripe parallel to the fluorescent stripes in the active fluorescent region 2600 of the screen 101. The SOL reference mark 2710 is fixed at a position with a known distance from the first fluorescent stripe in the region 2600. SOL patterns may include multiple vertical lines with uniform or variable spacing. Multiple lines are selected for redundancy, increasing signal to noise, accuracy of position (time) measurement, and providing missing pulse detection.

In operation, the scanning excitation beam 120 is scanned from the left to the right in the screen 101 by first scanning through the peripheral reference mark region 2610 and then through the active fluorescent region 2600. When the beam 120 is in the peripheral reference mark region 2610, the signal modulation controller in the laser module 110 of the system sets the beam 120 in a CW mode without the modulated optical pulses that carry the image data. When the scanning excitation beam 120 scans through the SOL reference mark 2710, the light reflected, scattered or emitted by the SOL reference mark 2710 due to the illumination by the excitation beam 2710 can be measured at an SOL optical detector located near the SOL reference mark 2710. The presence of this signal indicates the location of the beam 120. The SOL optical detector can be fixed at a location in the region 2610 on the screen 101 or off the screen 101. Therefore, the SOL reference mark 2710 can be used to allow for periodic alignment adjustment during the lifetime of the system.

The laser beam is turned on continuously as a CW beam before the beam reaches the SOL mark 2710 in a scan. When the pulse from the SOL detected is detected, the laser can be controlled to operate in the image mode and carry optical pulses with imaging data. The system then recalls a previously measured value for the delay from SOL pulse to beginning of the image area. This process can be implemented in each horizontal scan to ensure that each line starts the image area properly aligned to the color stripes. The correction is made prior to painting the image for that line, so there is no lag in correction allowing for both high frequency (up to line scan rate) and low frequency errors to be corrected.

Physical implementation of the SOL sensor may be a reflective (specular or diffuse) pattern with an area detector (s), an aperture mask with light pipe to collect the transmitted light into a single detector or multiple detectors.

With the reflective method, multiple lasers on and passing over reflective areas simultaneously may create self interference. A method to prevent this is to space the laser beams such that only one active beam passes over the reflective area at a time. Some optical reflection may come from the image area of the screen. To prevent this from interfering with the SOL sensor signal, the active laser beams may be spaced such that no other laser beams are active over any reflective area when the desired active laser beam is passing over the reflective SOL sensor area. The transmission method is not affected by reflections from the image area.

Similar to the SOL mark 2710, an end-of-line (EOL) reference mark can be implemented on the opposite side of the screen 101, e.g., in the peripheral reference mark region 2620 in FIG. 11. The SOL mark is used to ensure the proper alignment of the laser beam with the beginning of the image area. This does not ensure the proper alignment during the entire horizontal scan because the position errors can be present across the screen. Implementing the EOL reference mark and an end-of-line optical detector in the region 2620 can be used to provide a linear, two point correction of laser beam position across the image area.

When both SOL and EOL marks are implemented, the laser is turned on continuously in a continuous wave (CW) mode prior to reaching the EOL sensor area. Once the EOL signal is detected, the laser can be returned to image mode and timing (or scan speed) correction calculations are made based on the time difference between the SOL and EOL pulses. These corrections are applied to the next one or more lines. Multiple lines of SOL to EOL time measurements can be averaged to reduce noise.

In addition to control of the horizontal beam position along the scan direction perpendicular to the fluorescent stripes, the beam position along the vertical position parallel to the fluorescent stripes can also be monitored and controlled to ensure the image quality. Referring to FIG. 2B, each fluorescent stripe may not have any physical boundaries between two pixels along the vertical direction. This is different from the pixilation along the horizontal scan direction perpendicular to the fluorescent stripes. The pixel positions along the fluorescent stripes are controlled by the vertical beam position on the screen to ensure a constant and uniform vertical pixel positions without overlapping and gap between two different horizontal scan lines. Referring to the multi-beam scanning configuration in FIG. 7, when multiple excitation beams are used to simultaneously scan consecutive horizontal scan within one screen segment on the screen, the proper vertical alignment of the lasers to one another are important to ensure a uniform vertical spacing between two adjacent laser beams on the screen and to ensure a proper vertical alignment between two adjacent screen segments along the vertical direction. In addition, the vertical positioning information on the screen can be used to provide feedback to control the vertical scanner amplitude and measure the linearity of the vertical scanner.

Vertical position of each laser can be adjusted by using an actuator, a vertical scanner such as the galvo mirror 540 in FIG. 5, an adjustable lens in the optical path of each laser beam or a combination of these and other mechanisms. Vertical reference marks can be provided on the screen to allow for a vertical servo feedback from the screen to the laser module. One or more reflective, fluorescent or transmissive vertical reference marks can be provided adjacent to the image area of the screen 101 to measure the vertical position of each excitation beam 120. Referring to FIG. 11, such vertical reference marks can be placed in a peripheral reference mark region. One or more vertical mark optical detectors can be used to measure the reflected, fluorescent or transmitted light from a vertical reference mark when illuminated by the excitation beam 120. The output of each vertical mark optical detector is processed and the information on the beam vertical position is used to control an actuator to adjust the vertical beam position on the screen 101.

Figure 13:
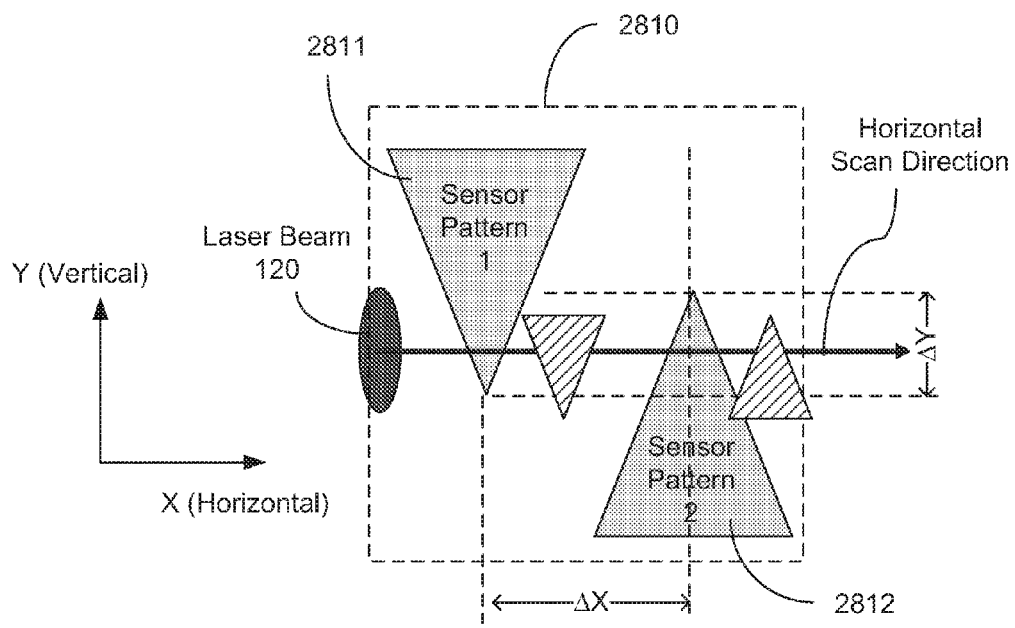
FIG. 13 shows an example of a vertical beam position reference mark for the screen in FIG. 11.

FIG. 13 shows an example of a vertical reference mark 2810. The mark 2810 includes is a pair of identical triangle reference marks 2811 and 2812 that are separated and spaced from each other in both vertical and horizontal directions to maintain an overlap along the horizontal direction. Each triangle reference mark 2811 or 2812 is oriented to create a variation in the area along the vertical direction so that the beam 120 partially overlaps with each mark when scanning through the mark along the horizontal direction. As the vertical position of the beam 120 changes, the overlapping area on the mark with the beam 120 changes in size. The relative positions of the two marks 2811 and 2812 defines a predetermined vertical beam position and the scanning beam along a horizontal line across this predetermined vertical position scans through the equal areas as indicated by the shadowed areas in the two marks 2811 and 2812. When the beam position is above this predetermined vertical beam position, the beam sees a bigger mark area in the first mark 2811 than the mark area in the second mark 2812 and this difference in the mark areas seen by the beam increases as the beam position moves further up along the vertical direction. Conversely, when the beam position is below this predetermined vertical beam position, the beam sees a bigger mark area in the second mark 2812 than the mark area in the first mark 2811 and this difference in the mark areas seen by the beam increases as the beam position moves further down along the vertical direction.

The feedback light from each triangle mark is integrated over the mark and the integrated signals of the two marks are compared to produce a differential signal. The sign of the differential signal indicated the direction of the offset from the predetermined vertical beam position and the magnitude of the differential signal indicates the amount of the offset. The excitation beam is at the proper vertical position when the integrated light from each triangle is equal, i.e., the differential signal is zero.

Figure 14A:
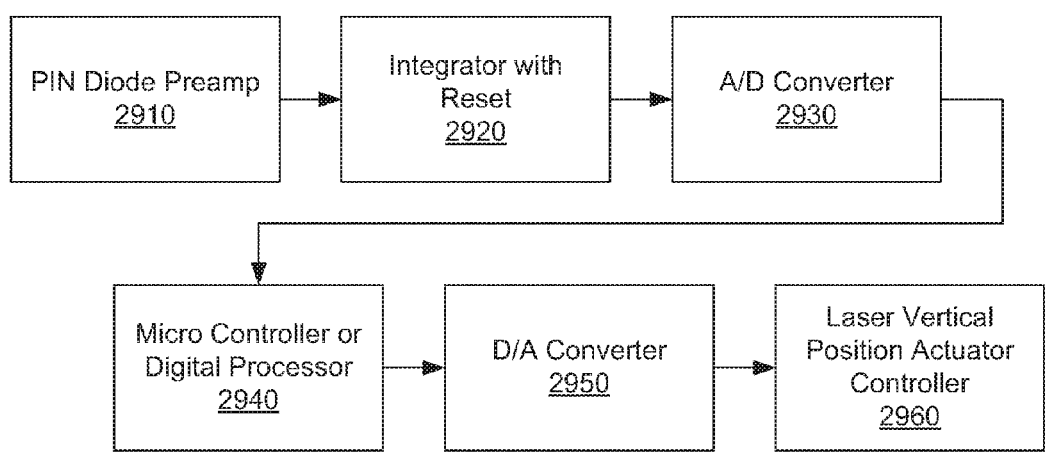

FIG. 14A shows a portion of the signal processing circuit as part of the vertical beam position servo feedback control in the laser module 110 for the vertical reference mark in FIG. 13. A PIN diode preamplifier 2910 receives and amplifies the differential signal for the two reflected signals from the two marks 2811 and 2812 and directs the amplified differential signal to an integrator 2920. An analog-to-digital converter 2930 is provided to convert the differential signal into a digital signal. A digital processor 2940 processes the differential signal to determine the amount and direction of the adjustment in the vertical beam position and accordingly produces a vertical actuator control signal. This control signal is converted into an analog control signal by a digital to analog converter 2950 and is applied to a vertical actuator controller 2960 which adjusts the actuator. FIG. 14B further shows generation of the differential signal by using a single optical detector.

Figure 15:
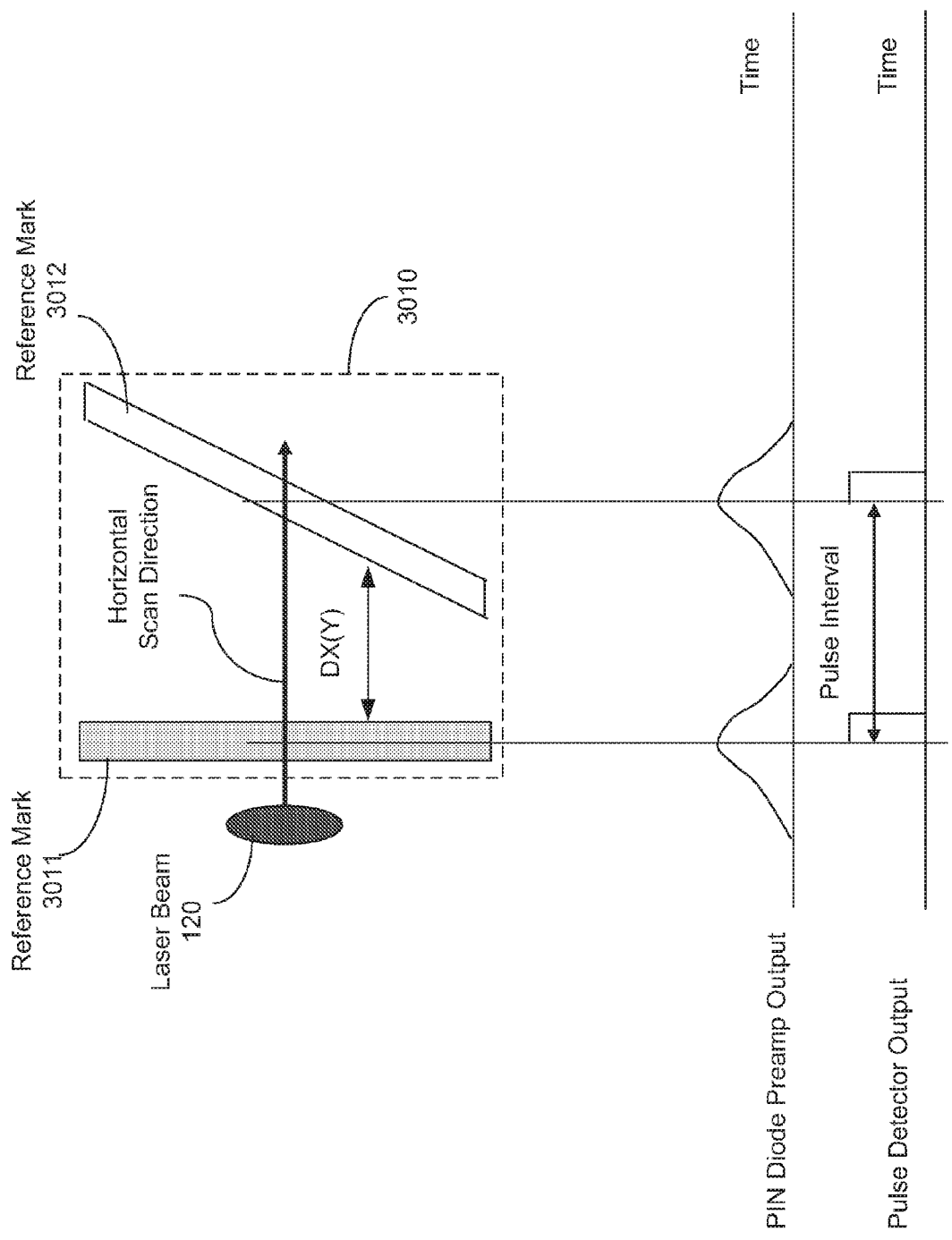
FIGS. 15 and 16 show another example of a vertical beam position reference mark for the screen in FIG. 11 and a corresponding servo feedback control circuit.
Figure 16:
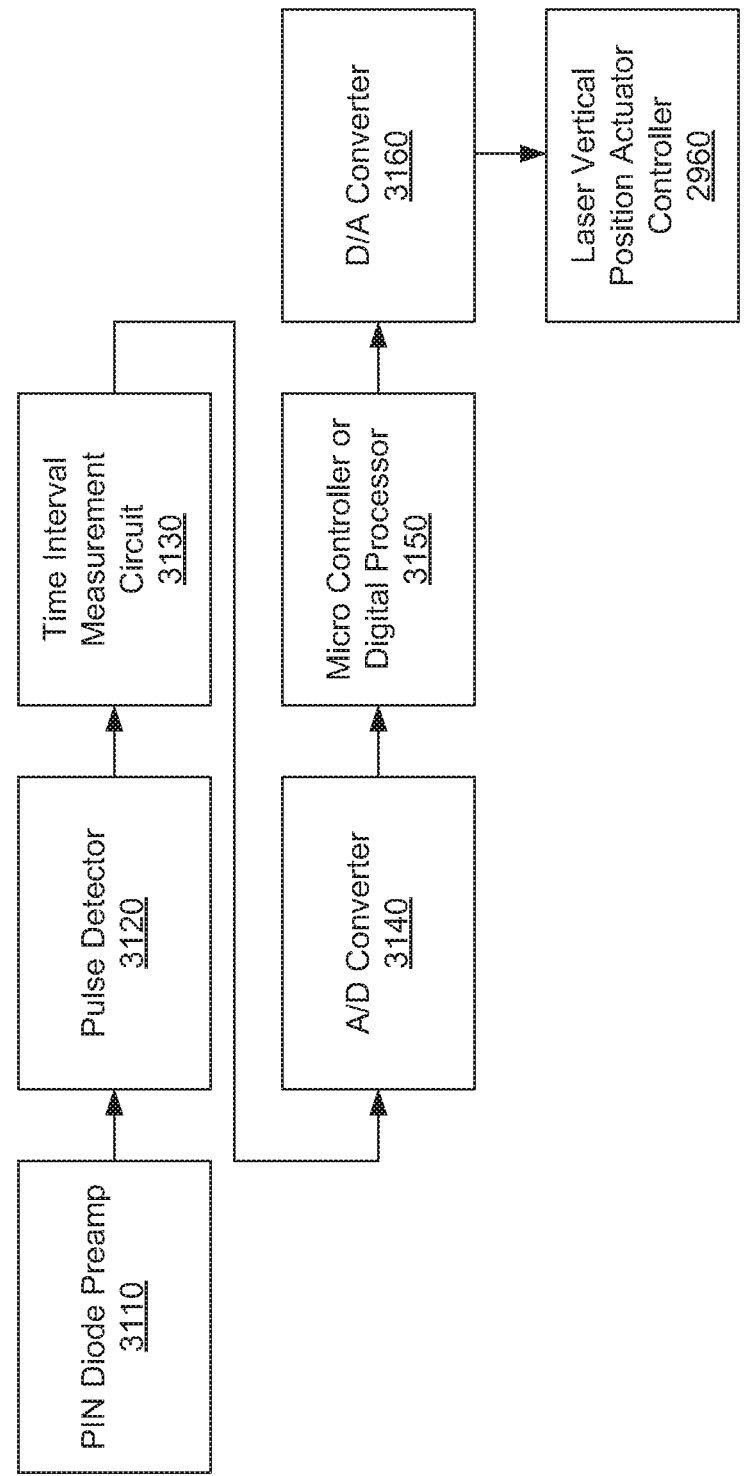

FIG. 15 shows another example of a vertical reference mark 3010 and a portion of the signal processing in a servo control circuit in FIG. 16. The mark 3010 includes a pair of reference marks 3011 and 3012 that are separated and spaced from each other in the horizontal scan direction and the horizontal distance DX(Y) between the two marks 3011 and 3012 is a monotonic function of the vertical beam position Y. The first mark 3011 can be a vertical stripe and the second mark 3012 can be a stripe at a slanted angle from the vertical direction. For a given horizontal scanning speed on the screen, the time for the beam to scan from the first mark 3011 to the second mark 3022 is a function of the vertical beam position. For a predetermined vertical beam position, the corresponding scan time for the beam to scan through the two marks 3011 and 3012 is a fixed scan time. One or two optical detectors can be used to detect the reflected light from the two marks 3011 and 3012 and the two optical pulses or peaks reflected by the two marks for the excitation beam 120 in the CW mode can be measured to determine the time interval between the two optical pulses. The difference between the measured scan time and the fixed scan time for the predetermined vertical beam position can be used to determine the offset and the direction of the offset in the vertical beam position. A feedback control signal is then applied to the vertical actuator to reduce the vertical offset.

FIG. 16 shows a portion of the signal processing circuit as part of the vertical beam position servo feedback control in the laser module 110 for the vertical reference mark in FIG. 15. A PIN diode preamplifier 3110 receives and amplifies the detector output signal from an optical detector that detects the reflected light from the two marks 3011 and 3012 during a horizontal scan. The amplified signal is processed by a pulse detector 3120 to produce corresponding pulses corresponding to the two optical pulses at different times in the reflected light. A time interval measurement circuit 3130 is used to measure the time between the two pulses and this time measurement is converted into a digital signal in an analog to digital converter 3140 for processing by a digital processor 3150. The digital processor 3150 determines the amount and direction of an adjustment in the vertical beam position based on the measured time and accordingly produces a vertical actuator control signal. This control signal is converted into an analog control signal by a digital to analog converter 3160 and is applied to a vertical actuator controller 2960 which adjusts the actuator.

A vertical reference mark may also be implemented by using a single triangular reference mark shown in FIG. 13 where the single triangle reference mark 2811 or 2812 is oriented to create a variation in the horizontal dimension of the mark along the vertical direction so that the beam 120 partially overlaps with the mark when scanning through the mark along the horizontal direction. When the vertical position of the beam 120 changes, the horizontal width of the mark scanned by the beam 120 changes. Hence, when the beam 120 scans over the mark, an optical pulse is generated in the reflected or fluorescent light generated by the mark and the width of the generated optical pulse is proportional to the horizontal width of the mark which is a function of the vertical beam position. At a predetermined vertical beam position, the optical pulse width is a fixed value. Therefore, this fixed optical pulse width can be used as a reference to determine the vertical position of the beam 120 relative to the predetermined vertical beam position based on the difference between the optical pulse width associated with the scanning of the beam 120 across the mark. An optical detector can be placed near the mark to detector the reflected or fluorescent light from the mark and the difference in the width of the pulse from the fixed value can be used to as a feedback control to adjust the vertical actuator for the beam 120 to reduce the offset of the vertical beam position.

In implementing multiple lasers for simultaneously scanning consecutive lines within one of multiple screen segments as shown in FIG. 4, two separate vertical positioning servo control mechanisms can be implemented. The first vertical positioning servo control is to control the line to line spacing of different horizontal lines scanned by different lasers at the same time within each screen segment. Accordingly, at each line, a vertical reference mark and an associated optical detector are needed to provide servo feedback to control the vertical beam position of each laser beam. Hence, this first vertical servo control mechanism includes N vertical servo feedback controls for the N lasers, respectively.

The second vertical positioning servo control is to control the vertical alignment between two adjacent screen segments by using the galvo mirror (e.g., 340 in FIG. 3B) to vertically move all N laser beams, after completion of scanning one screen segment, to an adjacent screen segment. This can be achieved by controlling the galvo mirror to make a common adjustment in the vertical direction for all N laser beams. The vertical reference mark in the peripheral reference mark region 2610 in FIG. 11 and the associated optical detector for the top line in each screen segment can be used to measure the vertical position of the first of the N laser beams when the beams are still scanning through the peripheral reference mark region 2610 in FIG. 11. This vertical information obtained in this measurement is used as a feedback signal to control the vertical angle of the galvo mirror to correct any vertical error indicated in the measurement. In implementations, this correction can lead to a small amplitude (micro-jog) correction signal to the vertical galvo for that scan line.

The vertical alignment between two adjacent screen segments is determined by a number of factors, including the galvo linearity at different galvo angles of the galvo mirror 340, the polygon pyramidal errors of the polygon scanner 350, and optical system distortions caused by various reflective and refractive optical elements such as mirrors and lenses. The polygon pyramidal errors are errors in the vertical beam positions caused by different tilting angles in the vertical direction at different polygon facets of the polygon 350 due to the manufacturing tolerance. One manufacturing tolerance on the polygon mirror is the pyramidal error of the facets. The implementation of the second vertical positioning servo control can compensate for the polygon pyramidal errors and thus a relatively inexpensive polygon scanner can be used in the present scanning display systems without significantly compromising the display quality.

The second vertical servo control based on the galvo micro-jog correction signal can also use a look-up table of pyramidal error values of the polygon 350. The pyramidal errors in this look-up table can be obtained from prior measurements. When a pyramidal error does not change significantly with temperature, humidity and others, this look-up table method may be sufficient without using the servo feedback based on a measured vertical beam position using the vertical reference mark described above. In implementation, the feedback control needs the identification of the polygon facet that is currently scanning a line and thus can retrieve the corresponding pyramidal error value for that polygon facet from the look-up table. The identification of the current polygon facet can be determined from a facet number sensor on the polygon 350.

Based on the above mechanisms for measuring real-time beam position on the screen, a scanning beam display system can be constructed to provide local dimming during the beam scanning for improved image brightness uniformity. In such a system, one or more light sources such as lasers are provided to produce one or more optical beams and a signal modulation controller is provided to be in communication with the one or more light sources to cause the one or more optical beams to be modulated as optical pulses that carry images to be displayed on the screen. An optical scanning module, which can include a vertical scanner and a polygon scanner, scans the one or more optical beams onto the screen to produce a raster scanning pattern for displaying the images. The signal modulation controller includes an image data storage device that stores data of the images to be displayed and operates to adjust optical energies of the optical pulses of the one or more optical beams with respect to positions of the one or more scanning optical beams on the screen to render the images on the screen. The signal modulation controller also includes a data storage device to store data of a predetermined spatial variation of at least one optical beam in connection with the location of the optical beam on the screen caused by one or more distortions in scanning the optical beam onto the screen. In operation, the signal modulation controller, in addition to adjusting optical energies of the optical pulses for rendering the images, adjusts optical energies of the optical pulses of at least one optical beam, based on the stored data on the predetermined spatial variation of the optical beam, to reduce the one or more distortions in the images displayed on the screen.

In some implementations, the predetermined spatial variation of the optical beam in connection with the location of the optical beam on the screen includes a variation in a beam spot size of the optical beam on the screen as the optical beam is scanned through different locations on the screen. This variation in the beam spot size can also change the beam spot brightness perceived by the viewer and thus cause undesired variation in screen brightness from one location to another. In some system implementations, the variation of the beam spot size is localized and does not significantly extend to the adjacent beam spot on the screen. Under this circumstance, one way for counteracting to this variation in the beam spot size with location of the scanning beam on the screen is to decrease an optical energy of an optical pulse as the beam spot size on the screen decreases and/or increase an optical energy of an optical pulse as the beam spot size on the screen increases. In some system implementations, however, the variation of the beam size may lead to nearly overlap or actual overlap of two adjacent beam spots either in two adjacent scan lines or within the same scan line to cause a perceived increase in brightness. To mitigate this variation in the beam spot size with location of the scanning beam on the screen, the optical energy of an optical pulse can be decreased as the beam spot size on the screen increases in a region where two adjacent beam spots nearly overlap or actually overlap due to the variation of the beam size.

Hence, the optical energy of optical pulses in at least one optical beam can be adjusted during the beam scanning based on the location of the scanning optical beam and the predetermined distortion information at the location to reduce undesired brightness variations. The signal modulation controller, for example, can be used to control the signal modulation to provide this position-dependent adjustment to the optical energy of optical pulses during the beam scanning. For another example, the optical power of the light source such as a laser for producing the scanning beam can be adjusted to provide this position-dependent adjustment to the optical energy of optical pulses during the beam scanning. Whether to increase or decrease the optical energy of the beam at a particular location is dependent on specific local conditions associated with the perceived local brightness. The location conditions can include local distortions to the beam spot on the screen, and closeness between two adjacent beam spots on the screen in either two adjacent scan lines or in the same scan line.

Figure 17:
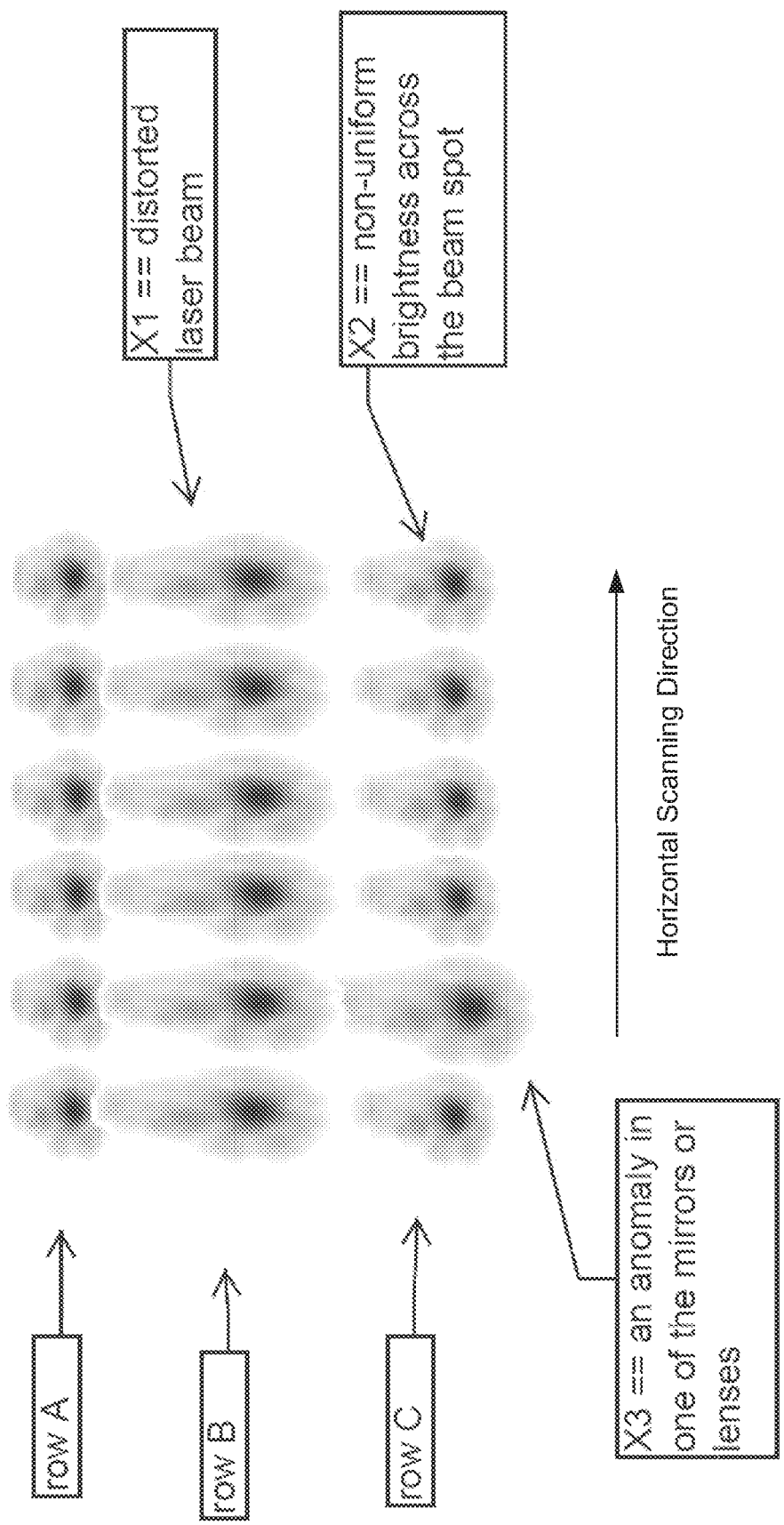
FIG. 17 shows examples of several beam effects on the screen that can affect uniformity of the screen brightness on the screen.

FIG. 17 shows examples of several beam effects on the screen that can affect uniformity of the screen brightness on the screen. Three horizontal scan lines are shown in form of three rows of beam spots as generated by optical pulses on the screen, Row A, Row B and Row C. Row A is an example of relative symmetric beam spots along a horizontal scan produced by the optical pulses in the scanning beam. As indicated by X1, Row B is an example of beam spots produced by a scanning beam that has an elongated shape along the vertical direction. Because of the elongated beam shape, the Row B beam spots along a horizontal scanning line are closer to an adjacent horizontal line, e.g., Row A, along the vertical direction. This closeness between two adjacent horizontal scan lines causes the local image to be brighter than the image in the region between Row B and Row C which are spaced from each other further apart than the spacing between Row A and Row B. This location based variation in screen brightness is undesirable and can be mitigated by using the local dimming on the screen brightness disclosed in this document.

FIG. 17 also illustrates other examples of possible non-uniform brightness conditions. As marked by X2, the asymmetric shape of a beam spot on the screen can produce a characteristic umbra of the beam brightness. The beam spot marked by X2 has an uneven brightness where the beam spot is brighter near the bottom of the egg shaped beam spot than the top of the egg shaped beam spot along the vertical direction. This beam effect adversely impact the uniformity of brightness on the rows of either side. Another example is marked by X3 where a beam spot at a particular location in a horizontal scan line is different from other beam spots in the same horizontal scan line. This may be caused one of several factors, e.g., an anomaly in one of reflective surfaces or lenses causing a shifter or non-uniform brightness spot, which again based on its proximity to spots on rows of either side of the spot in question may cause a brighter or weaker brightness condition. The local dimming described in this document can mitigate these effects.

In some implementations, the predetermined spatial variation of the optical beam in connection with the location of the optical beam on the screen includes a variation in spacing between two adjacent scanning lines produced by scanning of the one or more optical beams on the screen. This may be caused by various sources, such as a pyramidal error in a polygon scanner that is used to scan the one or more optical beams on the screen or by optical distortions caused by one or more optical lenses before the beam reaches the screen. In operation, the signal modulation controller can decrease an optical energy of an optical pulse as the spacing between two adjacent scanning lines produced by scanning of the one or more optical beams on the screen decreases and can increase an optical energy of an optical pulse as the spacing between two adjacent scanning lines produced by scanning of the one or more optical beams on the screen increases.

The unintended spatial variations of the optical beam at different positions on the screen can be caused by various factors in the system. For example, in FIGS. 3A and 3B, the two-dimensional scan lens 360, which can be an f-theta lens, can exhibit optical distortions along the two orthogonal scanning directions which cause beam positions on the screen to trace a curved line. More specifically, the scan lens 360, which may include more than one lens, can inherently have optical distortions that change with the incident angle and incident position of a scanning beam at the entrance of the scan lens 360. The scanning light is scanned along the horizontal direction by, e.g., a horizontal scanner such as a polygon scanner and along the vertical direction by, e.g., a vertical scanner such as a galvo mirror. The optical distortions in the scan lens 360 can cause beam positions on the screen 101 to trace a curved line rather than a straight horizontal scanned line. This is often referred to as a horizontal bow distortion. Similarly, the optical distortions in the scan lens 360 can cause beam positions on the screen 101, which ideally form a straight vertical line, to form a curved vertical line instead. This part of the optical distortions of the imaging lens assembly is also known as the vertical bow distortion.

The distortions caused by the scan lens 360 are present along both the horizontal and vertical directions due to due to the compound angle that is produced by the two mirror scanning in two orthogonal axes by the galvo mirror 340 and the polygon scanner 350. Such distortions degrade the displayed image and thus are undesirable.

Figure 18:
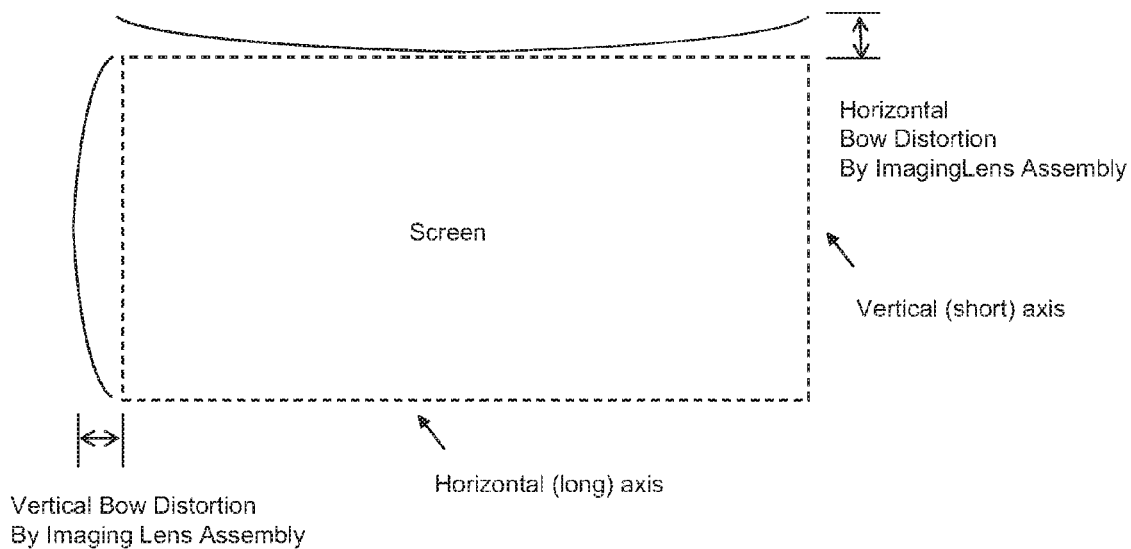
FIG. 18 illustrates bow distortions caused by a scan lens in a scanning display system.

FIG. 18 illustrates an example of the vertical and horizontal bow distortions by a two-dimensional f-theta scan lens located in the optical path between the scanning optical module (e.g., the polygon 350 and galvo mirror 340) and the screen 101. As illustrated, the bow distortion in each direction increases from the center of the screen towards the edge of the screen as the incident angle of the light to the scan lens increases.

One approach to mitigating the bow distortion problem is to design the scan lens in a way that reduces the distortions within an acceptable range. This optical approach may require complex lens assembly configurations with multiple lens elements. The complex multiple lens elements can cause the final lens assembly to depart from desired f-theta conditions and thus can compromise the optical scanning performance. The number of lens elements in the assembly usually increases as the tolerance for the distortions decreases. Hence, a lens assembly with an acceptable bow distortion in both directions may include multiple lens elements with complex geometrical shapes. Because the bow distortions are in both directions, the lens elements must be shaped properly in both directions.

Figure 19:
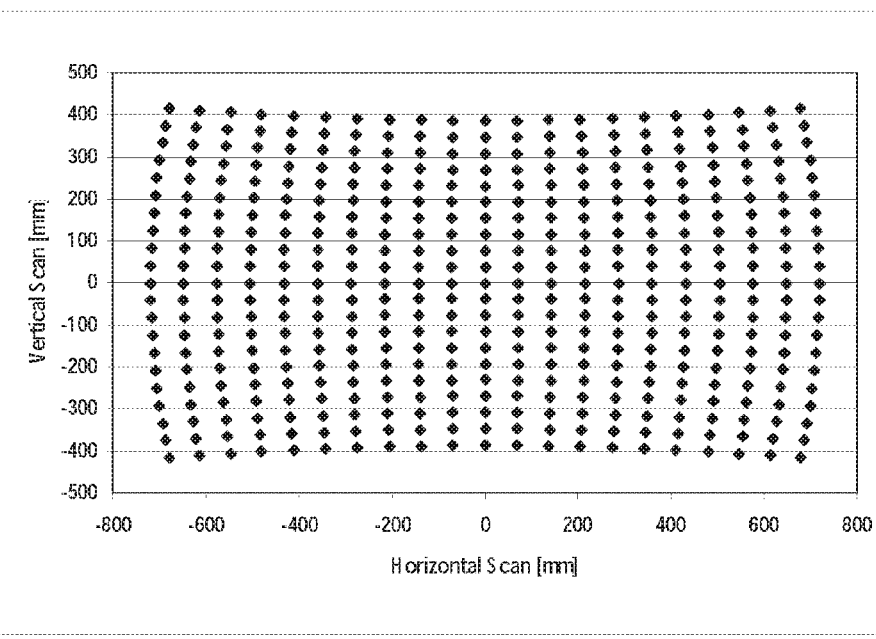
FIG. 19 shows an example of measured distortions on a screen caused by a scan lens in a scanning system.

FIG. 19 shows an example of a map of measured image pixel positions on a screen with optical bow distortions. The effects of the vertical and horizontal bow distortions caused by a scan lens assembly can be measured. Based on the measured distortions, e.g., beam spot spacing variations, the optical energy of the optical pulses can be adjusted to counter the non-uniformity in screen brightness caused by the measured distortions.

A digital or electronic distortion correction technique can be provided in a scanning beam display system. The image signals modulated onto a scanning beam are digitally or electronically distorted based on measured bow distortions of the scan lens to negate the bow distortions of the scan lens when the image is displayed on the screen. The digital correction of the vertical bow distortion of the scan lens can be achieved by controlling the timing of laser pulses in the scanning beam during each horizontal scan. This is because a horizontal location of a laser pulse on the screen 101 can be controlled by the timing of the laser pulse during each horizontal scan. A time delay in timing of a pulse can cause the corresponding position of the laser pulse on the screen to spatially shift downstream along the horizontal scan direction. Conversely, an advance in timing of a pulse can cause the corresponding position of the laser pulse on the screen to spatially shift upstream along the horizontal scan direction. A position of a laser pulse on the screen in the horizontal direction can be controlled electronically or digitally by controlling timing of optical pulses in the scanning beam. Notably, the vertical bow distortion can be treated as a shift in position of a pixel in the horizontal direction. Therefore, the timing of the pulses in the scanning beam can be controlled to direct each optical pulse to a location that reduces or offsets the horizontal displacement of the beam caused by the vertical bow distortion of the scan lens.

The horizontal bow distortion can be corrected with a different digital control by re-imaging the image data based on the distortions. As illustrated by the example in FIG. 19, for a given scanning system, the image distortion map on the screen can be measured. The data for this measured image distortion map can be stored in a memory of the digital processor or scan engine of the signal modulation controller in the laser module 110, e.g., the storage unit 1022 in FIG. 10. The digital processing can be programmed to use this measured image distortion map to compute the image warping. Incoming image data generated for an ideal and distortion-free scan lens is remapped based on the computed image warping into predistorted image data at different pixel locations from the original pixel locations so that, when the remapped image data is read out for display, the pixel brightness appears at the correct location on the screen. This remapping of image data on a pixel-by-pixel basis can be achieved by various image warping techniques, for example, by using a linear brightness interpolation between lines to produce minimal visual noise on the screen. Pixel remapping based on the above and other techniques can be effective in correcting the horizontal bow distortion.

The above digital correction method essentially creates new image data for a distorted image on the screen that negates the optical distortions in the scanning module and the optical train including the distortions caused by the scan lens 360. The laser beams are then modulated with the modified image data to display images on the screen. Due to the built-in distortions in the modified image data, the optical distortions in the final image on the screen are eliminated or minimized.

For another example, the pyramidal error in a polygon scanner can also cause brightness irregularities on the displayed images due to varying spacing between adjacent scanning lines produced by different facets of the polygon scanner. Because different mirror facets on the polygon mirror may not be exactly at the same orientation with respect to the rotation axis of the polygon scanner (e.g., the vertical direction), different facets may direct the same beam at different vertical directions. This deviation from one facet to another facet is known as the pyramidal error and can cause errors in vertical positions of different horizontal lines scanned by different facets of the polygon scanner. This pyramidal error can degrade the image quality on the screen. When a polygon is free of the pyramidal error, multiple horizontal lines on the screen scanned by different facets are equally spaced if the vertical scanning mirror operates at a constant scanning speed in the vertical direction. If the polygon scanner, however, has the pyramidal error, the horizontal lines on the screen from different facets are not equally spaced when the vertical scanner operates at a constant scanning speed in the vertical direction. The variation in the line spacing between two adjacent horizontal scan lines depends on the difference in orientations of the respective adjacent facets of the polygon scanner. Such uneven line spacing can distort the displayed images, and degrade the image quality such as colors, resolution, uniformity in image brightness and other quality factors of the images displayed on the screen.

FIGS. 20A and 20B illustrate the effect of the pyramidal errors in the polygon scanner when multiple scanning beams are scanned at the same time as shown in FIG. 4. If the polygon is free of pyramidal errors, different beams are simultaneously scanned at their designated vertical locations to produce parallel horizontal scan lines with an even vertical spacing. Due to the vertical scanning, each horizontal line is not perfectly horizontal and is skewed. FIG. 20A illustrates scanning of a single laser beam of a laser by different successive facets of the polygon without pyramidal errors. FIG. 20B shows that, when the polygon has pyramidal errors, the horizontal scans on successive facets of the polygon would have uneven vertical spacing. As described above, the optical energy of the optical beam scanned onto the screen can be adjusted to minimize the undesired variation in the image brightness due to this varying line spacing. As an example, as the beam of one row approaches the beam of an adjacent row, the intensity of the beam of one or the other rows may be reduced as the rows approach each other, so as not to give an appearance of a brightening of the local region, then as the beam rows move farther apart, the beam intensity may be increased back to its normal states.

Figure 21:
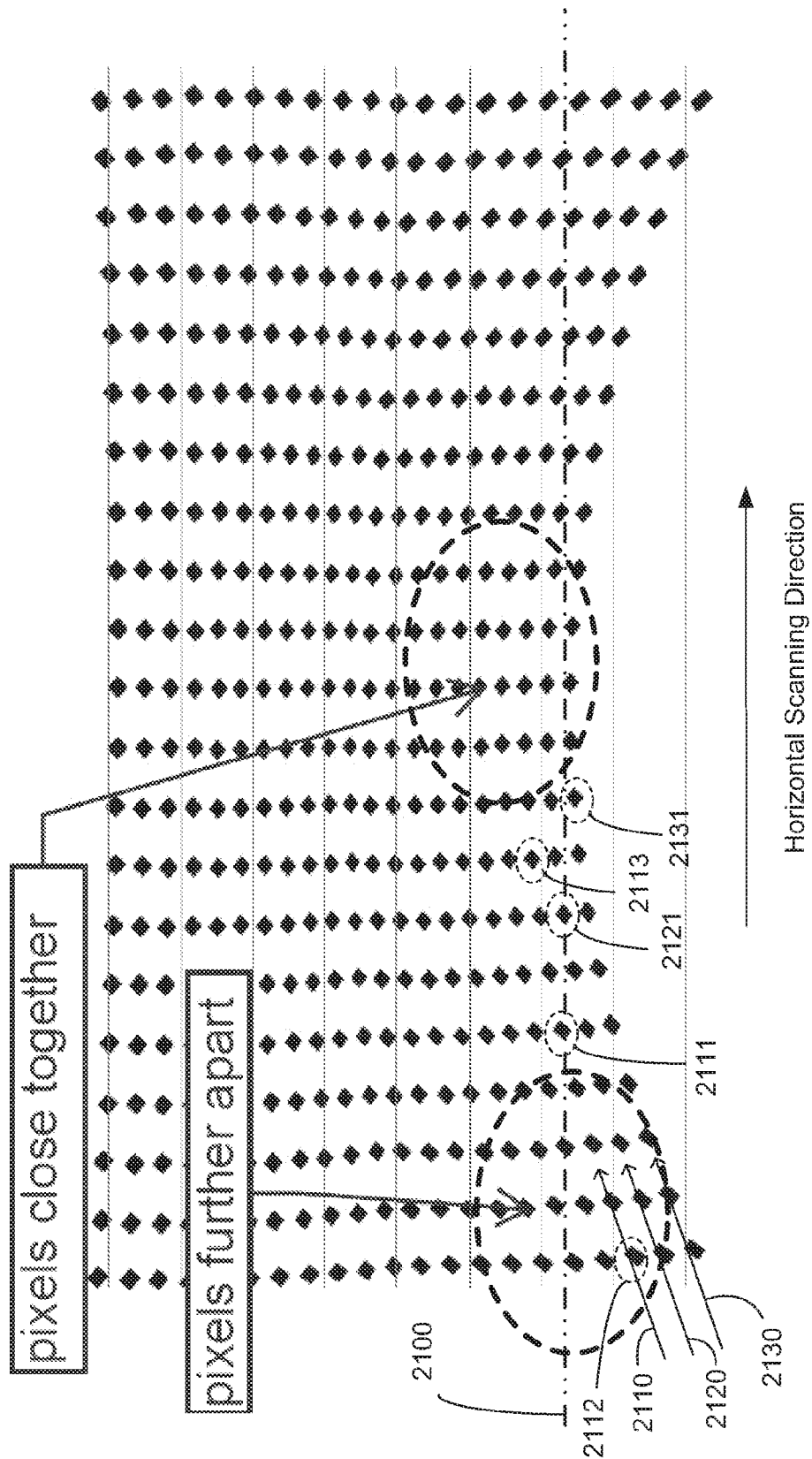
FIG. 21 shows another example of a map of measured image pixel positions on a screen.

FIG. 21 further shows another example of a map of measured image pixel positions on a screen. Different from the example in FIG. 18, the horizontal bow distortion at the lower part of the screen is much more pronounced than the vertical bow distortion. Due to the particular distortions in the optical system in this example, the pixels on the screen are spaced more sparsely in the marked lower left part of the screen than the marked lower central part of the screen to cause the screen brightness in the lower central part to be greater than that of the marked lower left part when the optical energy of optical pulses is not adjusted based on the location. The local dimming described in this document can be used to adjust the optical energy based on the known distortions in the screen to reduce the non-uniformity of the screen brightness.

In the example in FIG. 21, a straight horizontal line 2100 is shown near the bottom of the displayed image as an example of an "ideal" horizontal scan line. However, the distortions in this particular system cause each scan line near the bottom of the screen to curve as shown. Thus, in the region near the bottom of the screen, it is difficult to directly generate such a straight horizontal scan line by scanning an optical beam produced by a given laser. Therefore, the distortions in this example cause the straight lines to curve and the curved lines, in turn, cause the spacing between beam spots to vary from one location to another, leading to variations in screen brightness.

The re-imaging technique can be used to address the distortion of the curved lines. In the straight horizontal line 2100, locations 2111, 2121 and 2131 are respectively locations on the last three scan lines 2110, 2120 and 2130, which are curved due to distortions. Re-imaging can be used in this circumstance to produce the straight line 2100 on the screen by selecting beam spot locations on curved scan lines to form the straight line 2100.

In the example of the horizontal line 2100, beam spots on the curved scan line 2110 are used to form different horizontal straight lines. The beam spot 2111 on the curved scan line 2110, for example, is used to form a spot for the straight line 2100. Other beam spots on the curved scan line 2110 may be either used for displaying images or turned off. For example, the beam spot 2112 on the curved scan line 2110 is kept dark during display operation because it falls below the last straight line 2100 can be produced due to sever distortions near the bottom of the screen in this example. The beam spot 2113 on the curved scan line 2110 can be used as a beam spot for rendering a different horizontal line above the line 2100 on the screen. Notably, the horizontal line 2100 is formed by beam spots generated from different curved scan lines, e.g., the beam spot 2121 generated by the curved scan line 2120 and the beam spot 2131 generated by the curved scan line 2130. This re-imaging is performed digitally and does not require modification of the hardware. The local dimming is applied to the re-imaged beam spots to adjust the optical energy of optical pulses during the beam scanning based on the location of the scanning optical beam and the predetermined distortion information at the location to reduce undesired brightness variations.

The beam brightness uniformity control can be used in combination with the above distortion correcting techniques to further improve any remaining irregularities in the image brightness across the screen. During the scanning, optical energies of the optical pulses of the one or more optical beams are adjusted with respect to positions of the one or more scanning optical beams on the screen to render the images on the screen. In addition, the optical energies of the optical pulses of each optical beam are adjusted based on a predetermined spatial variation of the optical beam in connection with a location of the optical beam on the screen caused by one or more distortions in scanning the optical beam onto the screen, to reduce the one or more distortions in the images displayed on the screen.

Figure 22:
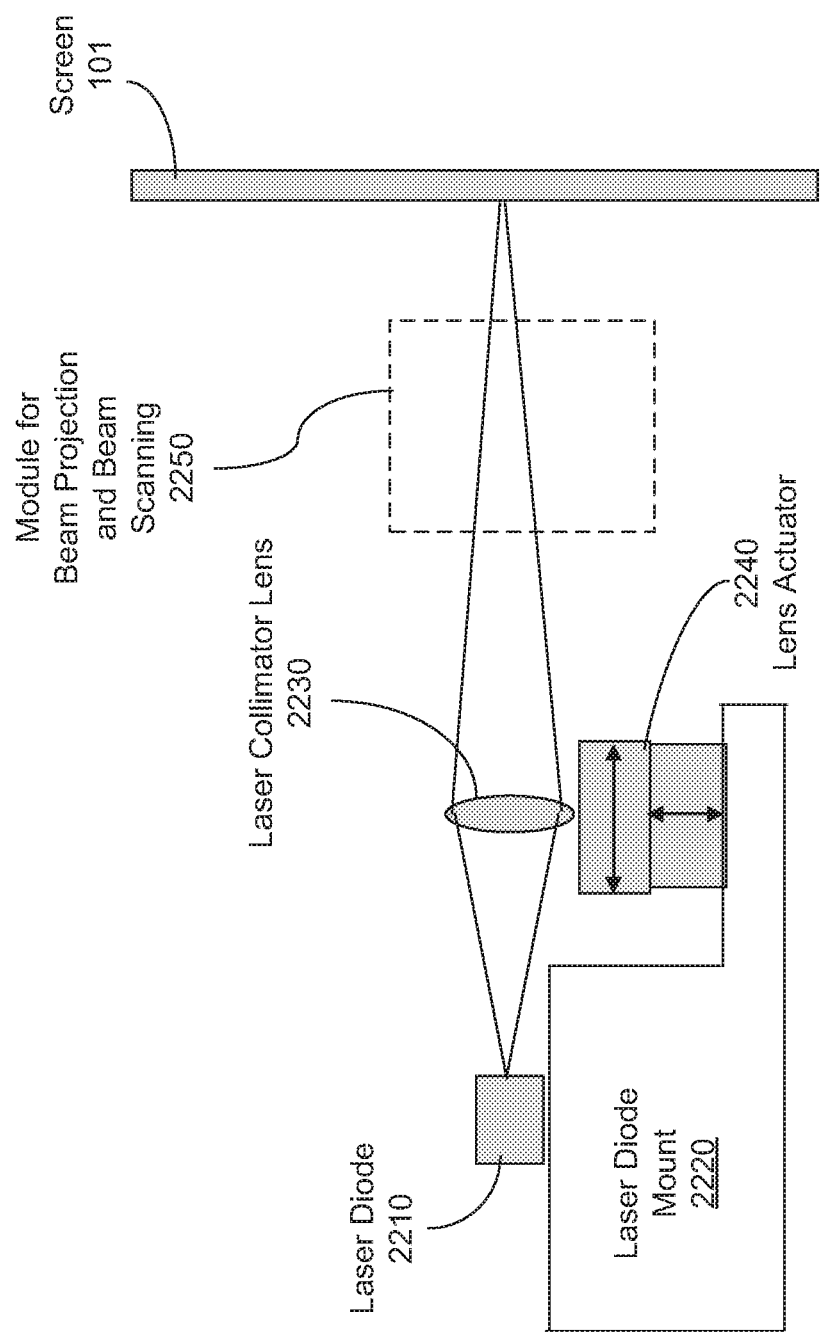
FIG. 22 shows one example of a laser actuator engaged to a collimator lens to control the size or position of the laser beam on the screen.

In the above vertical servo feedback control for each individual laser, a laser actuator can be provided for each laser of multiple lasers that generate multiple scanning beams. Each laser actuator operates to adjust the vertical direction of the laser beam in response to the servo feedback and to place the beam at a desired vertical beam position along a fluorescent stripe on the screen. FIG. 22 shows one example of a laser actuator 2240 engaged to a collimator lens 2230 which is placed in front of a laser diode 2210 to collimate the laser beam produced by the laser 2210. The collimated beam out of the collimator lens 2230 is scanned and projected onto the screen 101 by a module for beam projection and beam scanning 2250 which includes, among other elements, the galvo mirror 340, the polygon scanner 350 and a scan lens 360 or 380. The laser diode 2210, the collimator lens 2230 and the lens actuator 2240 are mounted on a laser mount 2220. The lens actuator 2240 can adjust the vertical position of the collimator lens 2230 along the vertical direction that is substantially perpendicular to the laser beam. This adjustment of the collimator lens 2230 changes the vertical direction of the laser beam and thus the vertical beam position on the screen 101.

As discussed above, optical distortions can also be caused by variations in the beam spot size on the screen. One example for mitigating this effect is to adjust the optical energy of the optical pulses to counter the variation in brightness caused by the variations of the beam spot size on the screen. Alternatively, a map of the beam spot size on the screen can be measured and the beam size can be adjusted during the beam scanning to counter the beam size variation caused by distortions. In FIG. 22, the lens actuator 2240 may be controlled to move the position of the collimator lens 2230 along the propagation direction of the laser beam and thus the focusing of the collimator lens 2230 on the laser beam on the screen 101 can be adjusted. This adjustment can change the beam spot size on the screen 101. In addition, both the optical energy and the beam size of the optical pulses can be adjusted during the beam scanning to reduce the variation in the screen brightness at different locations of the screen.

Figure 23:
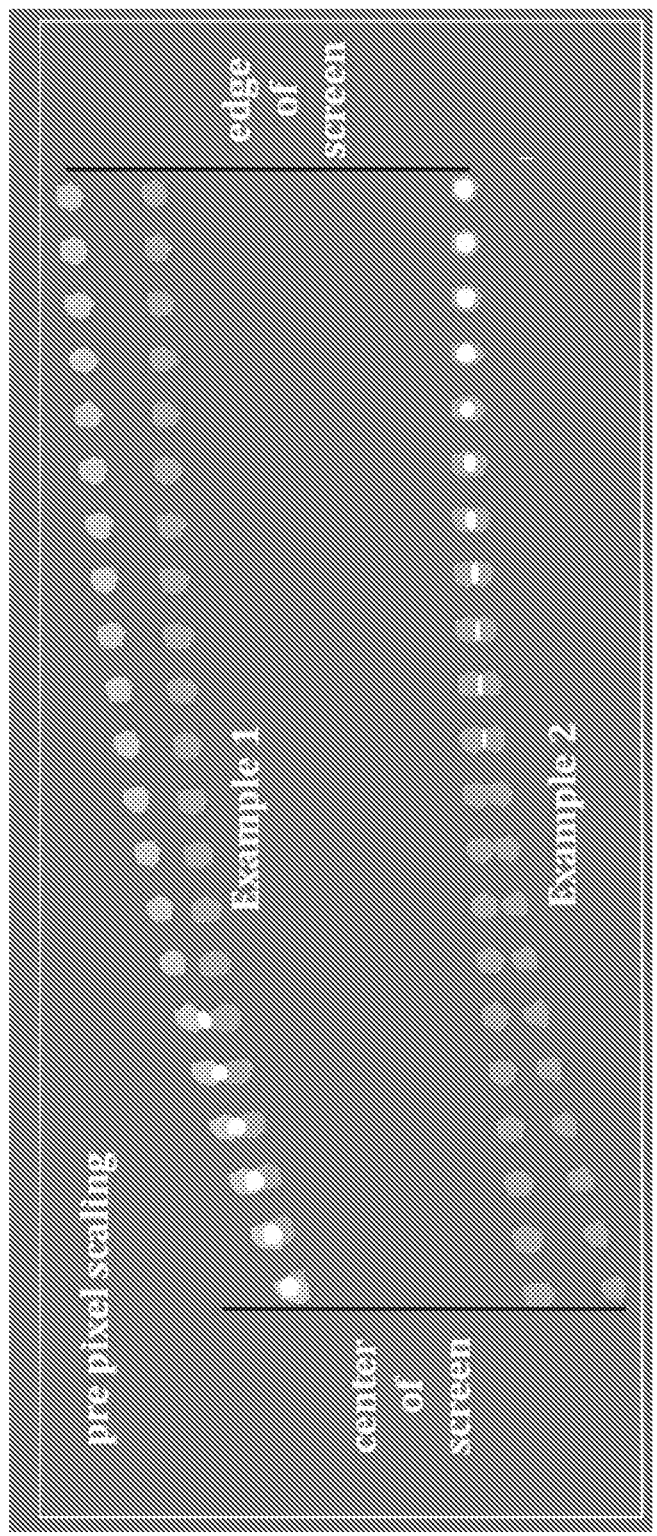
FIG. 23 illustrates spatial variations in the spacing between two adjacent scan lines and its effect on the screen brightness.

FIG. 23 illustrates spatial variations in the spacing between two adjacent scan lines and its effect on the screen brightness. The top two scan lines in FIG. 23 are closer to each other near the center of the screen while being further apart near the edge of the screen. This spacing variation causes the brightness near the center of the screen to be greater than that near the edge of the screen. The bottom two scan lines in FIG. 23 are closer to each other near the edge of the screen while being further apart near the center of the screen. This spacing variation causes the brightness near the edge of the screen to be greater than that near the center of the screen. Left uncorrected, the screen brightness can show visible spatial variation that degrades the image quality.

Figure 24A:
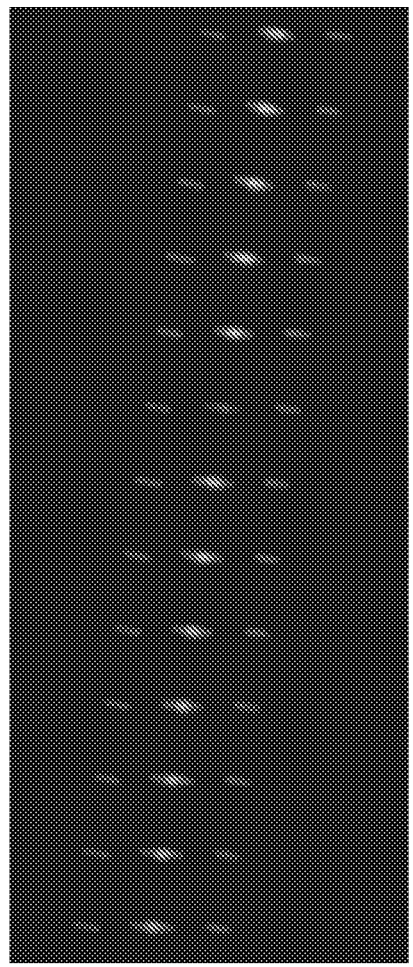
FIGS. 24A and 24B show photographs of beam spots on a screen having the line spacing variation illustrated in FIG. 23.
Figure 24B:
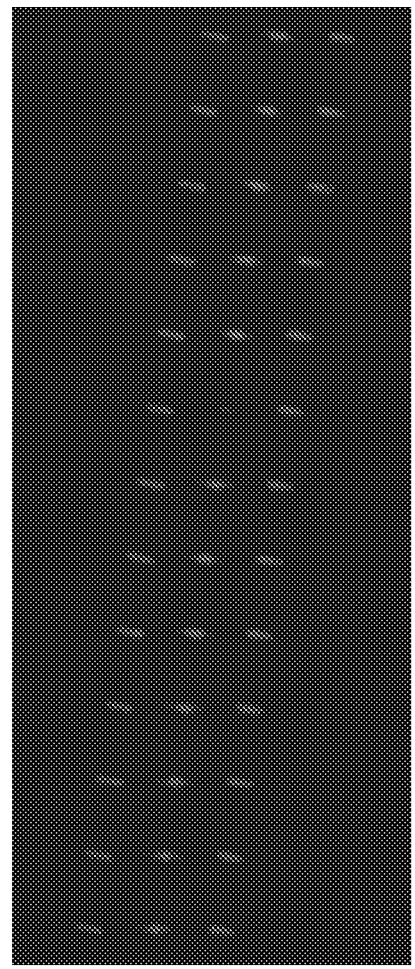

FIGS. 24A and 24B show photographs of beam spots on a screen having the line spacing variation illustrated in FIG. 23. FIG. 24A shows that the uneven screen brightness when no correction is applied to the optical energy of the scanning beams. FIG. 24B shows improved screen brightness uniformity when the local dimming is applied to adjust the optical energy of the scanning beams.

In the scanning mode shown in FIG. 4, optical distortions along the optical path between the light source and the screen can cause the spacing between two adjacent vertical screen segments to vary and to cause a spacing between two adjacent screen segments to be different from the line spacing between adjacent lines within a screen segment. This condition can significantly affect the spatial uniformity of the screen. FIG. 4 shows the inter-segment spacing (d) between the last horizontal scan line (N) and the first horizontal scan line (N+1) of the next screen segment. Due to various factors, the inter-segment spacing (d) can be either greater or smaller than the spacing between adjacent horizontal lines generated by different scanning beams within a single screen segment. As such, the screen brightness at the border between two adjacent screen segments can be either dimmer or brighter than the brightness of the screen segment. The present local dimming can be used to adjust the optical energy of the beams at the last scan line of a screen segment and the first scan line of the next adjacent screen segment to reduce visibility of the brightness variation at the border of two adjacent screen segments.

Embodiments of the subject matter and the functional operations for the local dimming described here can be implemented in digital electronic circuitry, in tangibly-embodied computer software or firmware, in hardware, including the structures disclosed in this specification and their structural equivalents, or in combinations of one or more of them. Embodiments of the subject matter described in this specification can be implemented as one or more computer programs, i.e., one or more modules of computer program instructions encoded on a computer storage medium for execution by, or to control the operation of, data processing apparatus. Alternatively or in addition, the program instructions can be encoded on a propagated signal that is an artificially generated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to as a program, software, software application, script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this document contains many specifics, these should not be construed as limitations on the scope of any invention or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Only a few implementations are disclosed. Variations and enhancements of the disclosed implementations and other implementations can be made based on what is described and illustrated in this document.

What is claimed is:

1. A display system, comprising:
light sources that produce optical beams at optical wavelengths in a violet spectral range or ultra violet (UV) spectral range;
a signal modulation controller in communication with the light sources to cause the optical beams to be modulated in form of a time domain signal modulation as optical pulses that carry images to be displayed;
a screen that receives the optical beams to display images carried by the optical beams and includes light-emitting regions that absorb light of the optical beams to emit visible light forming the images and one or more reference marks to produce feedback light from the screen from the illumination of the optical beams;
an optical scanning module that scans optical beams onto the screen to transform, via spatially scanning each optical beam along a scanning path on the screen, the time domain signal modulation in each optical beam into spatial images on the screen;

a designated optical detector located off the screen can to collect the optical feedback light from the screen to convert the collected optical feedback light into a detector signal that contains position information of each optical beam on the screen;

wherein the signal modulation controller receives the detector signal from the designated optical detector and operates to control the light sources, based on the time domain signal modulation and the position information of each optical beam on the screen in the received detector signal, to adjust optical energies of the optical pulses of the optical beams with respect to positions of the scanning optical beams on the screen to render the images on the screen via spatially scanning each optical beam on the screen, and wherein the signal modulation controller, in addition to adjusting optical energies of the optical pulses for transforming, via spatially scanning each optical beam along a scanning path on the screen, the time domain signal modulation in each optical beam into spatial images on the screen, adjusts optical energies of the optical pulses of at least one optical beam, based on information of a predetermined spatial variation of each optical beam in connection with the location of the optical beam on the screen caused by one or more distortions in scanning the optical beam onto the screen, to reduce the one or more distortions in the images displayed on the screen.

2. The system as in claim 1, wherein:

the predetermined spatial variation of the optical beam in connection with the location of the optical beam on the screen includes a variation in a beam spot size of the optical beam on the screen as the optical beam is scanned through different locations on the screen.

3. The system as in claim 2, wherein:

the signal modulation controller decreases an optical energy of an optical pulse as the beam spot size on the screen decreases and increases an optical energy of an optical pulse as the beam spot size on the screen increases.

4. The system as in claim 1, wherein:

the predetermined spatial variation of the optical beam in connection with the location of the optical beam on the screen includes a variation in spacing between two adjacent scanning lines produced by scanning of the optical beams on the screen.

5. The system as in claim 4, wherein:

the predetermined spatial variation of the optical beam in connection with the location of the optical beam on the screen includes a variation in spacing between two adjacent scanning lines produced by scanning of the one or more optical beams on the screen caused by a pyramidal error in a polygon scanner that is used to scan the one or more optical beams on the screen.

6. The system as in claim 4, wherein:

the optical scanning module includes optical lenses through which the optical beams transmit before reaching the screen; and the predetermined spatial variation of the optical beam in connection with the location of the optical beam on the screen includes a variation in spacing between two adjacent scanning lines produced by scanning of the optical beams on the screen caused by the optical lenses.

7. The system as in claim 4, wherein:

the signal modulation controller decreases an optical energy of an optical pulse as the spacing between two adjacent scanning lines produced by scanning of the one or more optical beams on the screen decreases and increases an optical energy of an optical pulse as the spacing between two adjacent scanning lines produced by scanning of the optical beams on the screen increases.

8. The system as in claim 1, wherein:

the one or more optical reference marks include a start of line reference mark that is located in a peripheral area on the screen that is outside an image displaying area where the images are displayed, and each optical beam is scanned through the start of line reference mark before reaching the image displaying area of the screen.

9. The system as in claim 1, wherein:

the one or more optical reference marks include an end of line reference mark that is located in a peripheral area on the screen that is outside an image displaying area where the images are displayed, and each optical beam is scanned through the image displaying area of the screen before reaching the end of line reference mark.

10. The system as in claim 1, wherein:

the signal modulation controller is configured to adjust both a beam size and optical energy of the optical pulses of at least one optical beam, based on the predetermined spatial variation of the optical beam, to reduce the one or more distortions in the images displayed on the screen.

* * * * *